US012762916B2

(12) United States Patent
Schneider et al.

(10) Patent No.: US 12,762,916 B2
(45) Date of Patent: Oct. 13, 2026

(54) LOTTERY TICKET SELLING SYSTEMS AND METHODS OF OPERATION THEREOF THAT EMPLOY TICKET PURCHASE TRAILERS FOR DRAW LOTTERY TICKET IMAGES

(71) Applicant: Brightstar Global Solutions Corporation, Providence, RI (US)

(72) Inventors: Paul Schneider, Jerome, ID (US); Robert Corvese, Warwick, RI (US)

(73) Assignee: Brightstar Global Solutions Corporation, Providence, RI (US)

( * ) Notice: Subject to any disclaimer, the term of this patent is extended or adjusted under 35 U.S.C. 154(b) by 23 days.

(21) Appl. No.: 19/071,216

(22) Filed: Mar. 5, 2025

(65) Prior Publication Data

US 2026/0268720 A1 Sep. 10, 2026

(51) Int. Cl.

| | |
|---|---|
| ***G06Q 30/0601*** | (2023.01) |
| ***G06F 3/14*** | (2006.01) |
| ***G06Q 20/20*** | (2012.01) |
| ***G06Q 30/018*** | (2023.01) |
| ***G06V 20/50*** | (2022.01) |
| ***G06V 40/10*** | (2022.01) |
| ***G07C 15/00*** | (2006.01) |
| ***G07F 17/32*** | (2006.01) |

(52) U.S. Cl.
CPC ......... *G07C 15/005* (2013.01); *G06Q 20/208* (2013.01); *G06Q 30/0185* (2013.01); *G07F 17/329* (2013.01)

(58) Field of Classification Search
CPC ............................ G06Q 20/208; G07C 15/005
See application file for complete search history.

(56) References Cited

U.S. PATENT DOCUMENTS

| | | | | |
|---|---|---|---|---|
| 10,121,139 B2* | 11/2018 | Pitroda | G16H 10/60 | |
| 10,783,744 B2* | 9/2020 | Asher | G06Q 40/12 | |
| 10,896,582 B2* | 1/2021 | Heathcote | G07F 17/329 | |
| 11,847,895 B2* | 12/2023 | Gotlieb | G06Q 50/34 | |
| 2007/0093298 A1* | 4/2007 | Brunet | G07F 17/32 | 463/17 |
| 2008/0132314 A1* | 6/2008 | Robb | G07F 17/329 | 463/25 |
| 2009/0100118 A1* | 4/2009 | Pollock | G07C 15/005 | 708/250 |
| 2012/0089468 A1* | 4/2012 | Guziel | G06Q 20/20 | 705/16 |

(Continued)

FOREIGN PATENT DOCUMENTS

| | | | |
|---|---|---|---|
| AU | 6444799 A * | 6/2000 | |
| WO | WO-2017013531 A1 * | 1/2017 | G07F 17/3234 |

OTHER PUBLICATIONS

A Platform for Secure Gambling, Blundo et al. (Year: 2004).*

(Continued)

*Primary Examiner* — Florian M Zeender
(74) *Attorney, Agent, or Firm* — Neal, Gerber & Eisenberg LLP

(57) ABSTRACT

Lottery ticket selling systems and methods of operating the systems that enable the purchase of a draw lottery ticket using a ticket purchase trailer for draw lottery ticket images, wherein the system includes an electronic ticket retail server, a bet processor, and a lottery terminal.

20 Claims, 10 Drawing Sheets

(56) References Cited

U.S. PATENT DOCUMENTS

| | | | | |
|---|---|---|---|---|
| 2016/0119332 | A1* | 4/2016 | Pitroda | G06Q 20/325<br>726/6 |
| 2019/0073652 | A1* | 3/2019 | Garrison | G06Q 20/208 |
| 2022/0148371 | A1* | 5/2022 | Gotlieb | G06Q 20/202 |
| 2024/0177573 | A1* | 5/2024 | Giunti | G06Q 20/209 |
| 2024/0290180 | A1* | 8/2024 | Kallis | G07F 17/42 |
| 2024/0395113 | A1* | 11/2024 | Riley | G07F 17/3225 |
| 2025/0022348 | A1* | 1/2025 | Charest | G07F 17/329 |
| 2025/0104534 | A1* | 3/2025 | Kallis | G06Q 20/20 |
| 2025/0111754 | A1* | 4/2025 | Roeygaard | G06Q 20/208 |
| 2026/0050901 | A1* | 2/2026 | Roeygaard | G06Q 20/20 |

OTHER PUBLICATIONS

"Regulatory Review: Lottery Courier Services in the US", Vixio, downloaded from the internet at, https://www.vixio.com/blog/regulatory-overview-lottery-courier-services-in-the-us, Feb. 16, 2024.

"What are Lottery Courier Services or Lottery Agents?", Locance, download from the internet at, https://www.google.com/url?sa=t&rct=j&q=&esrc=s&source=web&cd=&ved=2ahUKEwjc6qT_88-LAxU8IzQIHTAaJG0QFnoECBYQAQ&url=https%3A%2F%2Fwww.locance.com%2Fblog%2Fwhat-are-lottery-courier-services-or-lottery-agents%2F&usg=AOvVaw3THAO1h--uWk1tTiOJU9jg&opi=89978449, Feb. 7, 2023.

* cited by examiner

LOTTERY TICKET SELLING SYSTEMS AND METHODS OF OPERATION THEREOF THAT EMPLOY TICKET PURCHASE TRAILERS FOR DRAW LOTTERY TICKET IMAGES

BACKGROUND

The present disclosure relates to lottery ticket selling systems that employ ticket purchase trailers for draw lottery ticket images.

For a draw lottery ticket for a draw lottery game, a player may select the player numbers or may have an electronic lottery system randomly select the player numbers (which is often referred to as a quick pick). Draw lottery tickets may be purchased in variety of different manners using a variety of different systems such as systems that include lottery terminals. Various different jurisdictions (such as states) have different rules regarding how such draw lottery tickets can be purchased.

BRIEF SUMMARY

In various embodiments, the present disclosure relates to lottery ticket selling systems that employ ticket purchase trailers for draw lottery tickets.

In various embodiments, the present disclosure relates to a lottery ticket selling system comprising a lottery terminal associated with a code reader and a lottery ticket printer, a lottery ticket scanner, a bet processor that is associated with an electronic bet details display device and comprises a bet trailer processor and a bet trailer memory device that stores a first plurality of instructions, and an electronic ticket retail server comprising a server processor and a server memory device that stores a second plurality of instructions. The second plurality of instructions, when executed by the server processor, cause the server processor to: receive an order from a player electronic device associated with an original purchaser, the order comprising bet details for a purchase of a draw lottery ticket; generate a ticket purchase identifier for the draw lottery ticket prior to the purchase of the draw lottery ticket, wherein the original purchaser is uniquely identifiable using the ticket purchase identifier; generate bet slip data that comprises the bet details for the draw lottery ticket; and send the bet slip data and the ticket purchase identifier to the bet processor. The first plurality of instructions stored on the bet processor memory device, when executed by the bet trailer processor, cause the bet trailer processor to: generate a digital bet slip that includes the bet details based on the bet slip data; display the digital bet slip via the electronic bet details display device to enable the lottery terminal to scan the displayed digital bet slip via the code reader, cause a purchase of the draw lottery ticket, and cause the lottery ticket printer to print the draw lottery ticket; cause the lottery ticket scanner to scan the printed draw lottery ticket to obtain ticket image data for the printed draw lottery ticket; obtain ticket details for the printed draw lottery ticket from the ticket image data; and generate a ticket purchase trailer for the printed draw lottery ticket based on the ticket details and the ticket purchase identifier, wherein the ticket purchase trailer comprises the ticket purchase identifier and associates the original purchaser with the printed draw lottery ticket.

In various other embodiments, the present disclosure relates to a lottery ticket selling system comprising a lottery terminal associated with a code reader and a lottery ticket printer, a lottery ticket feeder comprising a housing and a plurality of roll engagers supported by the housing, a lottery ticket scanner, a bet processor that comprises an electronic bet details display device, a bet trailer processor, and a bet trailer memory device that stores a first plurality of instructions, and an electronic ticket retail server comprising a server processor and a server memory device that stores a second plurality of instructions. The second plurality of instructions, when executed by the server processor, cause the server processor to: receive an order from a player electronic device associated with an original purchaser, the order comprising bet details for a purchase of a draw lottery ticket; generate a ticket purchase identifier for the draw lottery ticket prior to the purchase of the draw lottery ticket, wherein the original purchaser is uniquely identifiable using the ticket purchase identifier; generate bet slip data that comprises the bet details for the draw lottery ticket; and send the bet slip data and the ticket purchase identifier to the bet processor. The first plurality of instructions stored on the bet processor memory device, when executed by the bet trailer processor, cause the bet trailer processor to: generate a digital bet slip that includes the bet details based on the bet slip data; display the digital bet slip via the electronic bet details display device to enable the lottery terminal to scan the displayed digital bet slip via the code reader, cause a purchase of the draw lottery ticket, and cause the lottery ticket printer to print the draw lottery ticket; cause the lottery ticket feeder to feed the printed draw lottery ticket to the lottery ticket scanner; cause the lottery ticket scanner to scan the printed draw lottery ticket to obtain ticket image data for the printed draw lottery ticket; obtain ticket details for the printed draw lottery ticket from the ticket image data; and generate a ticket purchase trailer for the printed draw lottery ticket based on the ticket details and the ticket purchase identifier, wherein the ticket purchase trailer comprises the ticket purchase identifier and associates the original purchaser with the printed draw lottery ticket.

In various other embodiments, the present disclosure relates to a lottery ticket selling system comprising a lottery terminal associated with a code reader and a lottery ticket printer, a lottery ticket scanner, a bet processor that is associated with an electronic bet details display device and comprises a bet trailer processor and a bet trailer memory device that stores a first plurality of instructions, a lottery central system comprising a central server processor and a central server memory device that stores a second plurality of instructions, and an electronic ticket retail server comprising a ticket server processor and a ticket server memory device that stores a third plurality of instructions. The third plurality of instructions, when executed by the ticket server processor, cause the ticket server processor to: receive an order from a player electronic device associated with an original purchaser, the order comprising bet details for a purchase of a draw lottery ticket; generate a ticket purchase identifier for the draw lottery ticket prior to the purchase of the draw lottery ticket, wherein the original purchaser is uniquely identifiable using the ticket purchase identifier; generate bet slip data that comprises the bet details for the draw lottery ticket; and send the bet slip data and the ticket purchase identifier to the bet processor. The first plurality of instructions stored on the bet processor memory device, when executed by the bet trailer processor, cause the bet trailer processor to: generate a digital bet slip that includes the bet details based on the bet slip data; display the digital bet slip via the electronic bet details display device to enable the lottery terminal to scan the displayed digital bet slip via the code reader, cause a purchase of the draw lottery ticket by the lottery central system, and cause the lottery ticket printer to print the draw lottery ticket; cause the lottery ticket scanner to scan the printed draw lottery ticket to obtain ticket image data for the printed draw lottery ticket; obtain ticket details for the printed draw lottery ticket from the ticket image data; and generate a ticket purchase trailer for the printed draw lottery ticket based on the ticket details and the ticket purchase identifier, wherein the ticket purchase trailer comprises the ticket purchase identifier and associates the original purchaser with the printed draw lottery ticket.

Additional features are described in, and will be apparent from, the following Detailed Description and the figures.

DETAILED DESCRIPTION

Figure 1:
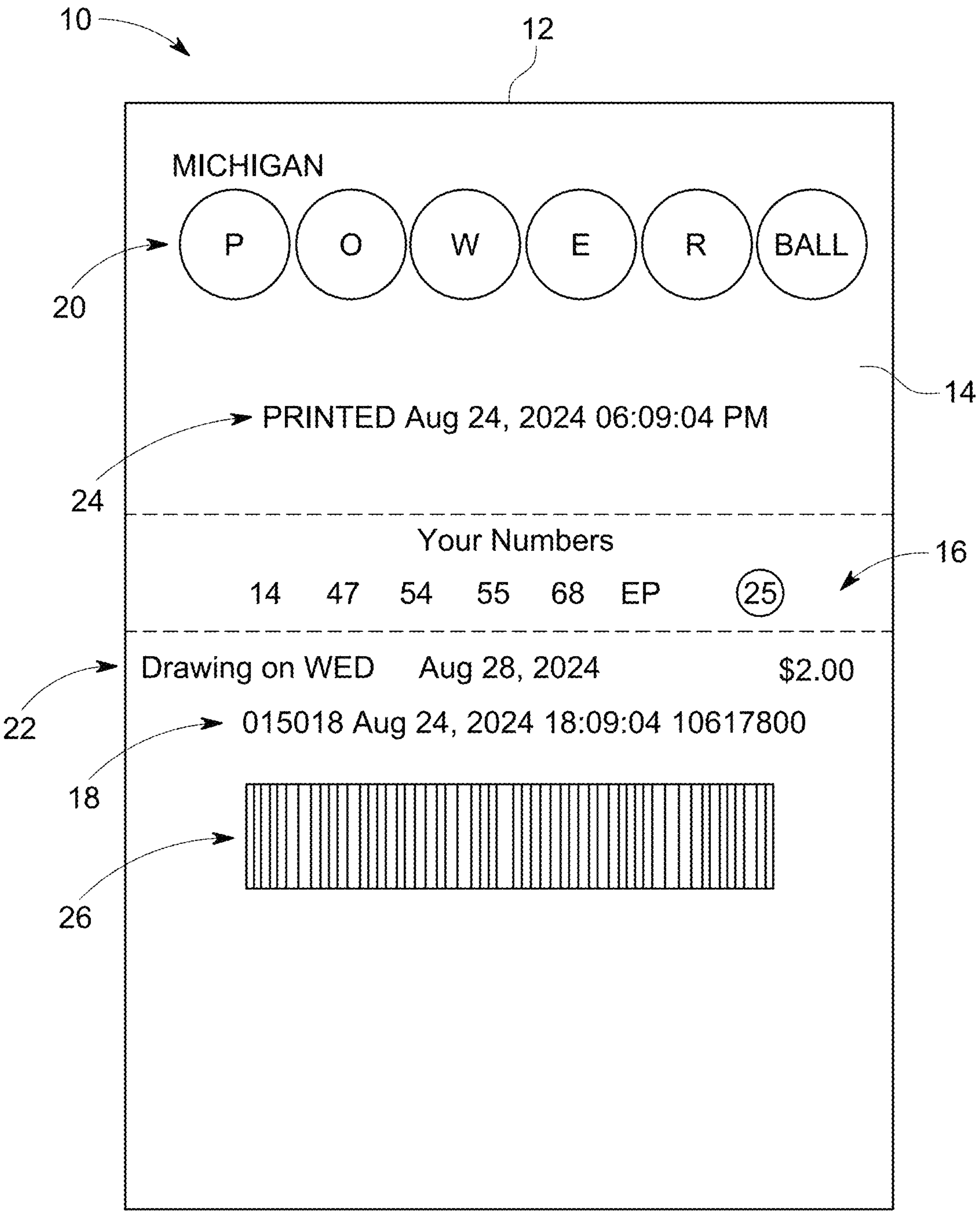
FIG. 1 is front view of an example draw lottery ticket.

In various embodiments, the present disclosure relates generally to lottery ticket selling systems and methods of operating the lottery ticket selling systems, wherein the lottery ticket selling systems include a bet processor that generates a ticket purchase trailer, such as a trailer digital image, for ticket digital images of a printed draw lottery ticket. The ticket purchase trailer includes a ticket purchase identifier that is generated for the draw lottery ticket prior to a purchase of that draw lottery ticket. The ticket purchase identifier enables tracking of the draw lottery ticket and/or association of the draw lottery ticket with an original purchaser of that draw lottery ticket without modification to the printed draw lottery ticket itself.

In various embodiments, the lottery ticket selling system includes: (a) a player electronic device with a mobile application downloaded thereon; (b) an electronic ticket retail server; (c) a bet processor; (d) a lottery terminal; (e) a lottery central system; (f) a lottery ticket printer; and (g) a lottery ticket scanner.

In various other embodiments, the lottery ticket selling system includes: (a) an electronic ticket retail server; (b) a bet processor; (c) a lottery terminal; (d) a lottery ticket printer; and (e) a lottery ticket scanner, wherein the electronic ticket retail server is configured to communicate with each of a plurality of player electronic devices.

In various other embodiments, the lottery ticket selling system includes: (a) an electronic ticket retail server; (b) a bet processor; and (c) a lottery ticket scanner, wherein the electronic ticket retail server is configured to communicate with each of a plurality of player electronic devices.

In various embodiments, the lottery ticket selling system enables: (1) an original purchaser to employ a player electronic device to cause a purchase of a draw lottery ticket without visiting a lottery terminal at a retail location; and (2) generation of a ticket purchase trailer or other suitable ticket purchase identifier that is employable to associate the purchased draw lottery ticket with the original purchaser.

In various other embodiments, the lottery ticket selling system enables: (1) an original purchaser to employ a player electronic device to cause a purchase of a draw lottery ticket without visiting a lottery terminal at a retail location; (2) prior to the purchase of the draw lottery ticket, generation of a ticket purchase identifier employable to associate the purchased draw lottery ticket with the original purchaser; (3) purchase of the draw lottery ticket; (4) printing of the purchased draw lottery ticket; (5) scanning of the printed draw lottery ticket to obtain ticket image data; (6) generation of a ticket purchase trailer that includes the ticket purchase identifier; and (7) generation of a combined draw lottery ticket and trailer image that includes the ticket image data and the ticket purchase trailer.

In various other embodiments, the lottery ticket selling system enables: (1) an original purchaser to employ a player electronic device to cause a purchase of a draw lottery ticket without visiting a lottery terminal at a retail location; (2) prior to the purchase of the draw lottery ticket, generation of a ticket purchase identifier employable to associate the purchased draw lottery ticket with the original purchaser; (3) purchase of the draw lottery ticket; (4) printing of the purchased draw lottery ticket; (5) scanning of the printed draw lottery ticket to obtain ticket image data; (6) generation of a ticket purchase trailer that includes the ticket purchase identifier; (7) generating a combined draw lottery ticket and trailer image that includes the ticket image data and the ticket purchase trailer; and (8) storing of the combined draw lottery ticket and trailer image.

Draw lottery tickets for draw lottery games are employed as example lottery tickets herein; however, it should be appreciated that the present disclosure is not meant to be limited by such examples.

For a better understanding of the present disclosure, an example draw lottery ticket is first described herein.

A draw lottery ticket can include: (1) a single set of player numbers for a single play of a draw lottery game; (2) multiple sets of player numbers for a single play of a draw lottery game; (3) a single set of player numbers for each of multiple plays of a draw lottery game; or (4) multiple sets of player numbers for each of multiple plays of a draw lottery game. For simplicity, the present disclosure uses a draw lottery ticket with a single set of player numbers for a single play of a draw lottery game as an example, but it should be appreciated that the present disclosure can be employed for purchasing and redeeming such various other draw lottery tickets.

An example physical draw lottery ticket 10 is shown in FIG. 1. This example draw lottery ticket includes: (1) a ticket substrate 12; (2) a front surface 14 of the ticket substrate 12; (3) lottery ticket information, including a single set of player numbers (for a single play of draw lottery game), printed on the front surface 14 of the ticket substrate 12; and (4) a back surface (not shown) of the ticket substrate 12. This example draw lottery ticket 10 is for a single play of a draw lottery game (scheduled to take place on Wednesday Aug. 28, 2024) and includes a single set of player numbers 16 (i.e., player numbers for the single play of the draw lottery game). The lottery ticket information in this example includes player numbers 16, a ticket identifier 18 that uniquely identifies the lottery ticket 10, a game identifier 20 that identifies the lottery game type, a draw date 22 associated with the ticket 10, and a print date 24 on which the ticket 10 was printed. It should be appreciated that while this draw lottery ticket is for a single play, draw lottery tickets often include multiple sets of player numbers that are for a single play of the draw lottery game. The lottery ticket information can include text, one or more ticket numbers (shown as the ticket identifier 18), one or more ticket barcodes (shown as barcode 26), and other lottery ticket information that is in either or both human readable and machine-readable forms. The lottery ticket's barcode 26 is configured to be scanned by a barcode reading device to enable redemption of such draw lottery ticket.

Additionally, for a better understanding of the present disclosure, an example known system and method employed for purchasing draw lottery tickets is also now described.

Figure 2:
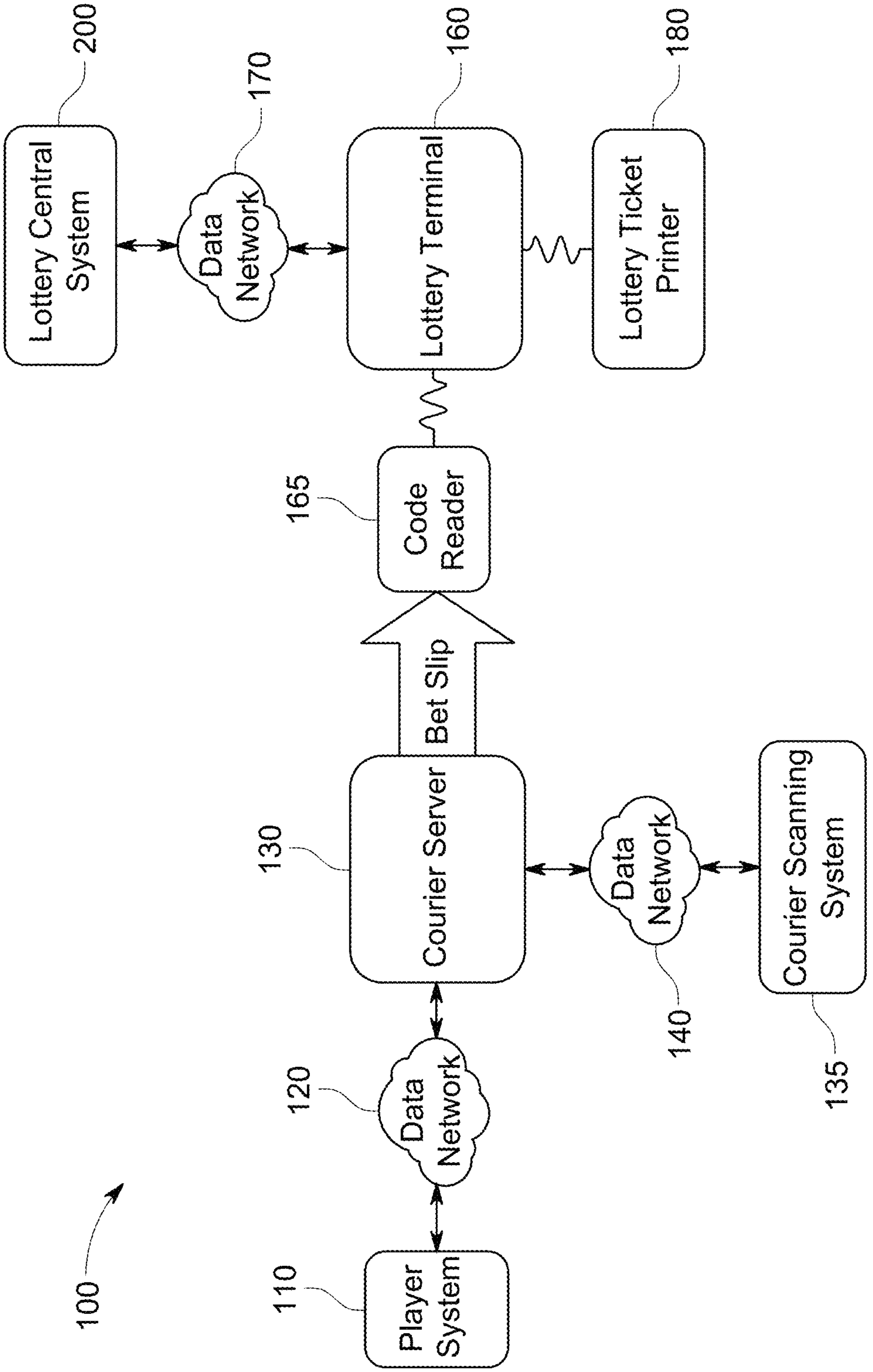
FIG. 2 is a diagrammatic view of a known lottery ticket selling system, showing a courier server that employs a bet slip to enable a purchase of a draw lottery ticket such as the draw lottery ticket of FIG. 1.

Various jurisdictions (such as various states) do not permit remote or electronic purchase of draw lottery tickets, and in various such jurisdictions, an example known lottery ticket system using a courier service has been employed. Turning to FIG. 2, an example known courier system 100 (or "system 100") includes: (a) a player system 110 with a courier mobile application downloaded thereon; (b) a courier server 130; (c) a courier scanning system 135; (d) a lottery terminal 160; (e) a code reader 165 associated with the lottery terminal 160; (f) a lottery ticket printer 180; and (g) a lottery central system 200.

The player system 110 and the courier server 130 are configured to communicate with each other via a data network 120. The courier server 130 and the courier scanning system 135 are configured to communicate with each other via a data network 140. The lottery terminal 160 and the code reader 165 are configured to communicate with each other via hard wire such as an USB connector. The lottery terminal 160 and the lottery ticket printer 180 are configured to communicate with each other via hard wire such as an USB connector. The lottery terminal 160 and the lottery central system 200 are configured to communicate with each other via a data network.

The player system 110 includes a player electronic device, such as a smartphone with the courier mobile application downloaded thereon. The player system 110 is employable by an original purchaser (also sometimes referred to herein as a "player") to purchase a draw lottery ticket.

The courier server 130 includes a server configured to receive bet details from the player system 110 via the courier mobile application and to generate a suitable bet slip for the draw lottery game based on the bet details. The bet slip includes lottery ticket information, such as a player's selected numbers or quick pick numbers for a selected play of a selected draw lottery game. The bet slip(s) are provided to the lottery terminal 160 for printing of draw lottery tickets.

The courier scanning system 135 includes an image capture device configured to scan a printed draw lottery ticket to obtain scanned ticket image data. The courier scanning system 135 provides the scanned ticket image data to the courier server 130.

The lottery terminal 160 enables an original purchaser and/or operator of the lottery terminal 160 to use such components to input lottery ticket purchase data for selecting and paying for draw lottery tickets that the original purchaser desires to obtain. That is, the lottery terminal 160 generates the lottery ticket information for the lottery ticket based on user inputs (e.g., bet details) from the original purchaser and/or operator of the lottery terminal 160 via the purchaser interface components.

The lottery ticket printer 180 is configured to receive lottery ticket printing data from the lottery terminal 160 and print a physical lottery ticket based on the lottery ticket printing data.

The lottery central system 200 includes a server configured to provide draw lottery games and to facilitate the purchase, validation, and redemption of draw lottery tickets for such draw lottery games.

The courier system 100 has been used to enable players to remotely electronically purchase draw lottery tickets for draw lottery games wherein the courier service conducts various physical steps of the lottery ticket purchase process on behalf of the players. More specifically, this known system enables a purchase of a draw lottery ticket for a draw lottery game remotely. A player uses the player system 110 (such as an application on their smartphone) to purchase a draw lottery ticket (which can include the player inputting the player's selected numbers or a quick pick indication for the draw lottery game). This application is referred to as a courier mobile application.

The courier mobile application functions to create bet details (including the player's selected numbers, quick pick numbers that the courier mobile application randomly selected, or a quick pick indication for a lottery terminal to randomly select the quick pick numbers) and causes the player's smartphone to send the bet details via the data network 120 to the courier server 130 at a courier processing center. The courier server 130 uses the received bet details to create and cause a courier printer (not shown) to physically print a physical paper bet slip for the play of the draw lottery game at the courier processing center. The bet slip includes the bet details, such as the player numbers or the quick pick indication.

A human courier processing clerk takes the printed paper bet slip for the play of the draw lottery game to an operator of the lottery terminal 160 at a physical location of the lottery terminal 160 that is remote from the courier processing center. The operator uses the code reader 165 associated with the lottery terminal 160 to scan the printed paper bet slip. The code reader 165 creates bet slip scan data for the draw lottery ticket, and a terminal application of the lottery terminal 160 uses that bet slip scan data to determine the player numbers for the play of the draw lottery game and to create the lottery ticket. The lottery terminal 160 causes the lottery ticket printer 180 to print out the draw lottery ticket with the player numbers. The operator of the lottery terminal 160 also collects the payment for the draw lottery ticket from the courier processing clerk and provides the printed draw lottery ticket to the courier processing clerk. The courier processing clerk then takes the printed bet slip and the printed draw lottery ticket back to the courier processing center.

The courier processing clerk scans the printed draw lottery ticket using the courier scanning system 135 connected to the courier server 130. The courier server 130 links the scanned draw lottery ticket back to a player account established through the courier mobile application. The courier server 130 then makes the scanned lottery ticket available for the player to view via the courier mobile application on the player system 110. The courier processing clerk places the printed bet slip and the printed draw lottery ticket in secure courier storage locations for storage if needed at a later time.

After the draw for the play of the draw lottery game takes place, if the player's lottery ticket is a winning lottery ticket and the winning amount is less than $600, the courier server automatically credits the winning amount for the player's draw lottery ticket to the player's account. The courier service can then retrieve and redeem the stored actual winning printed draw lottery ticket at a location having a lottery terminal. After the draw for the draw lottery game takes place, if the player's lottery ticket is a winning lottery ticket and the winning amount is $600 or more, a courier processing clerk retrieves the stored winning physical player lottery ticket from the courier storage location and sends that printed draw lottery ticket to the player so that the player can cash in that lottery ticket and obtain the winning amount.

For a better understanding of various embodiments of the lottery systems and methods of the present disclosure, certain encryption, decryption, and hashing systems and methods are now described.

In cryptography, encryption is the process of encoding information. This process converts the original representation of the information (known as plaintext) into an alternative form (known as ciphertext). Ideally, only authorized parties can decipher a ciphertext back to plaintext and access the original information. Encryption does not itself prevent interference but denies the intelligible content to a would-be interceptor. Encryption can be performed using a secret key of some kind. It is thus generally only possible to decrypt the ciphertext if the secret key is known. There is typically no loss of information between the original text or decrypted ciphertext. The encryption process can include chained encryption where the result of the first encryption is encrypted again using a different secret key. Chained encryption can include performing the encryption process one or more additional times with different secret keys. Decryption is performed backward using the last secret key, then the next to last secret key, etc.

Hashing is a function that is used to map data of an arbitrary size to a static-size value, though there are some hash functions that provide a variable length output. The value returned by a hash function is called a hash value, a hash code, a hash digest, a digest, or simply a hash. Hashing is a one-way function. In other words, once an original text has been hashed, it is not normally feasible to determine the original text if only the hash is known. Typically, determining the original text using the hash value can be done only by trying all possible original texts and determining if the hash of each candidate is the same as the hash of the original. By adding additional secret text to the original text, it is possible to lengthen the calculations and thus time required to try all possible values. This is called salting the hash. Another option for hashing is a keyed hash. This is a different kind of hash function (sometimes called a hash message authentication code, or HMAC) where the hash is performed on the original data, and this hashing method uses a separate set of data called a key. By varying the key, the same original text can hash into different hashed results.

Figure 3A:
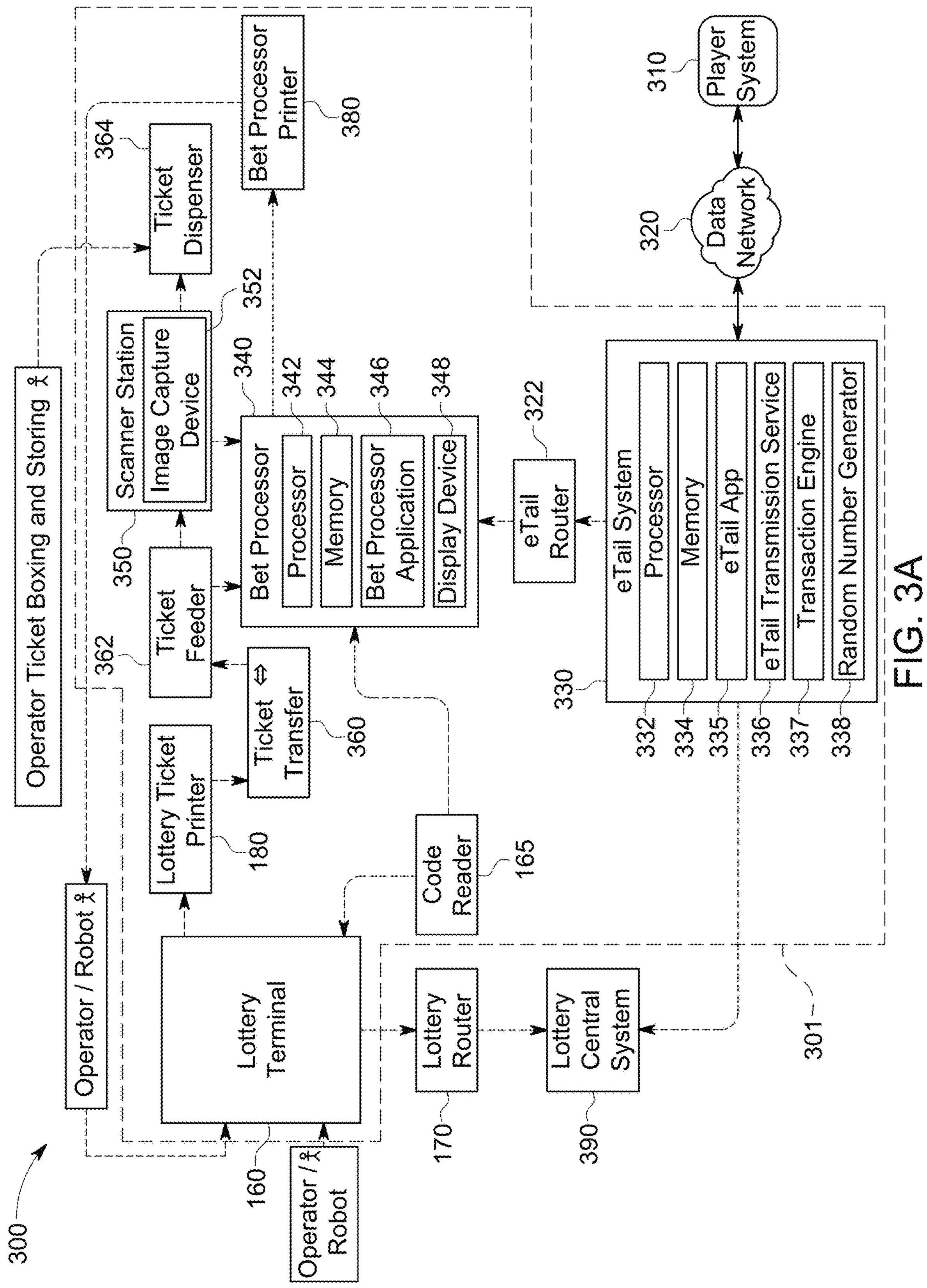
FIG. 3A is a diagrammatic view of an example lottery ticket selling system that includes a bet processor employing a ticket purchase trailer for draw lottery ticket images, in accordance with one example embodiment of the present disclosure.
Figure 3B:
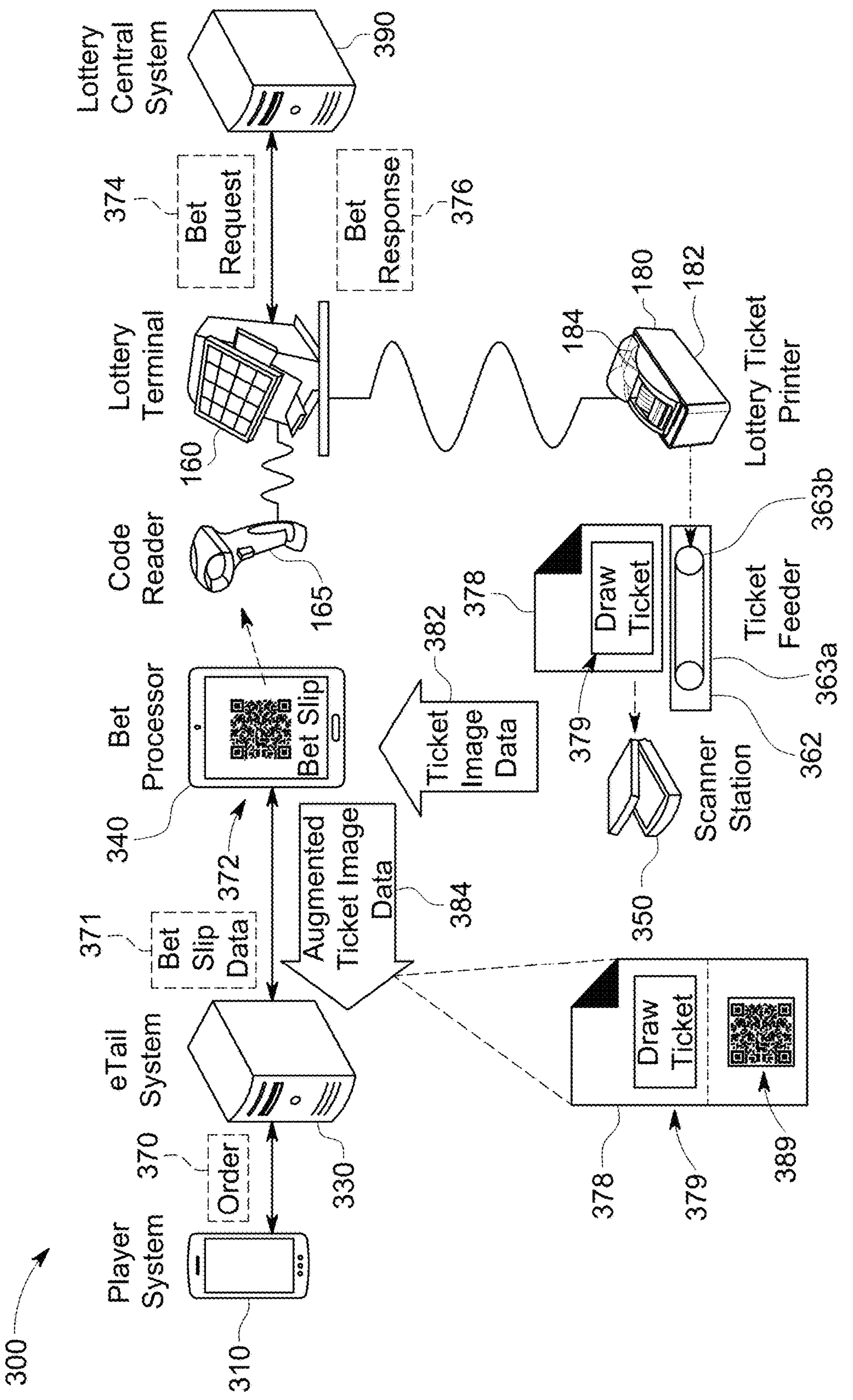
FIG. 3B is a perspective view of the example lottery ticket selling system of FIG. 3A, diagrammatically showing the bet processor causing a ticket purchase trailer to be appended to a draw lottery ticket image, in accordance with one example embodiment of the present disclosure.

Turning now to FIG. 3A and FIG. 3B, an example lottery ticket selling system 300 in accordance with one example embodiment of the present disclosure is shown.

Figure 4:
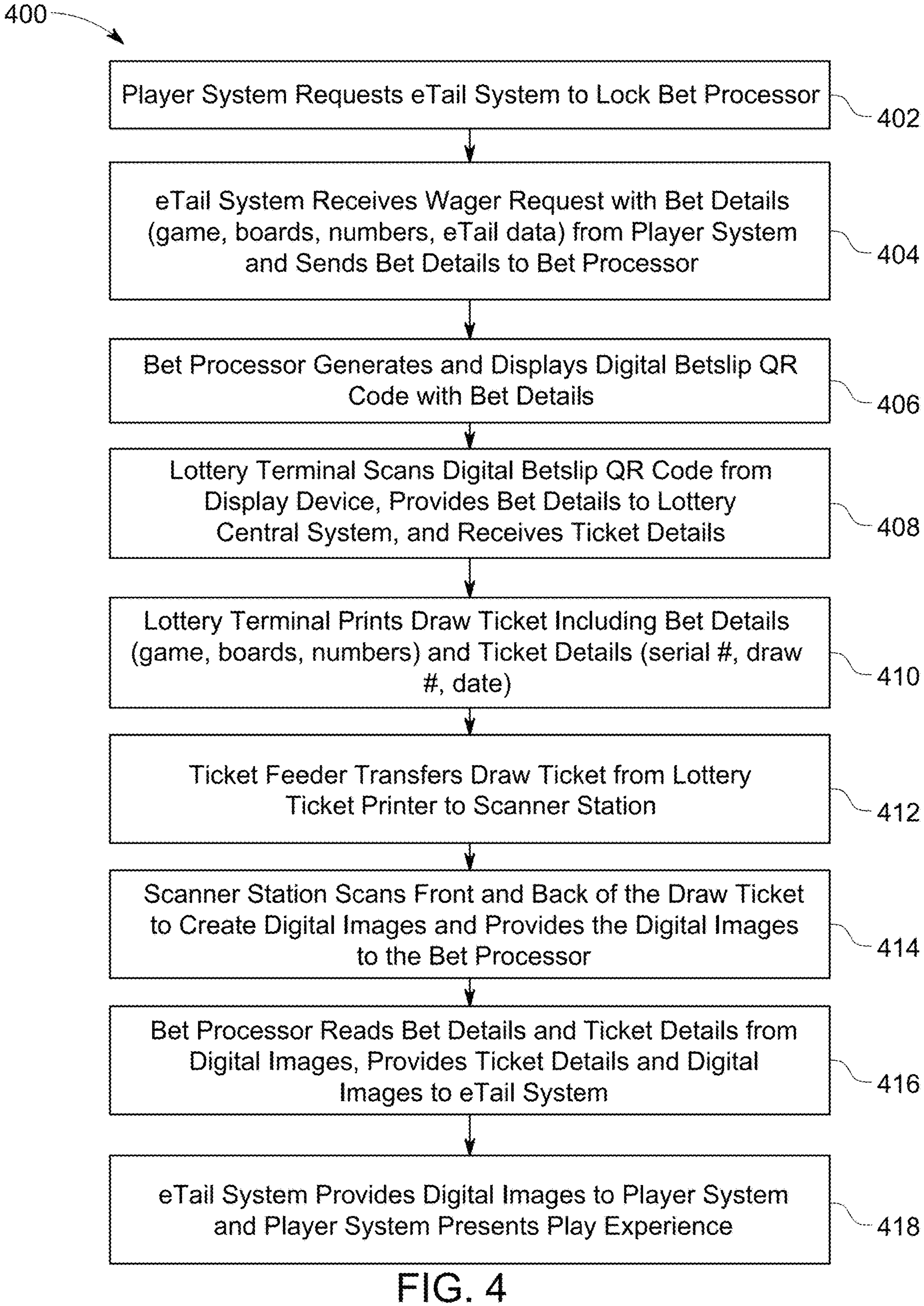
FIG. 4 is a flow diagram showing one example method of operation of the lottery ticket selling system of FIG. 3A for a draw lottery ticket purchase in accordance with one example embodiment of the present disclosure.

An example method 400 of operation of the lottery ticket selling system 300 for a draw lottery ticket purchase in accordance with one example embodiment of the present disclosure is shown in FIG. 4 and described below.

Figure 5:
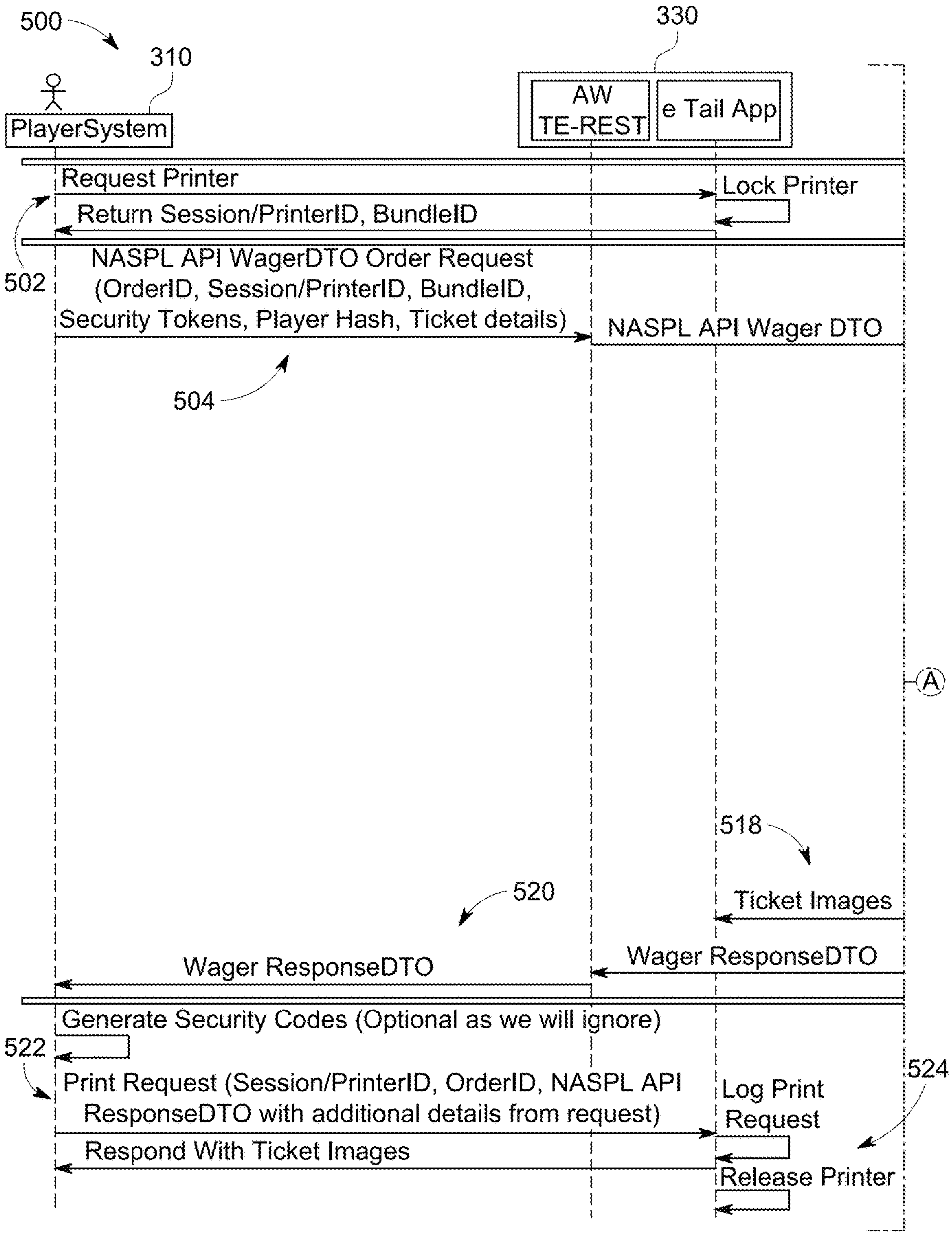
FIG. 5 is a flow diagram showing another example method of operation of the lottery ticket selling system of FIG. 3A for a draw lottery ticket purchase in accordance with one example embodiment of the present disclosure.
Figure 5:
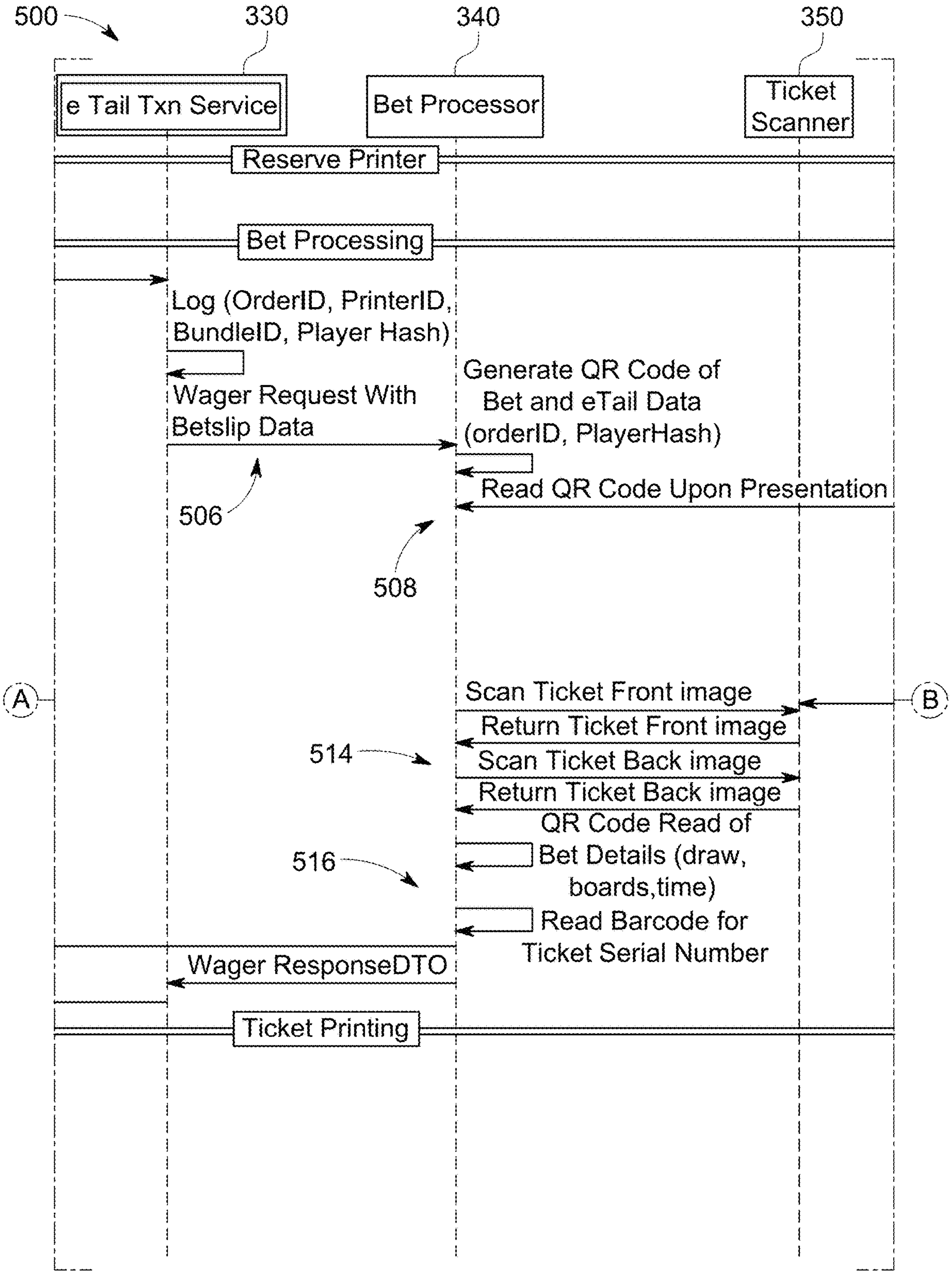
Figure 5:
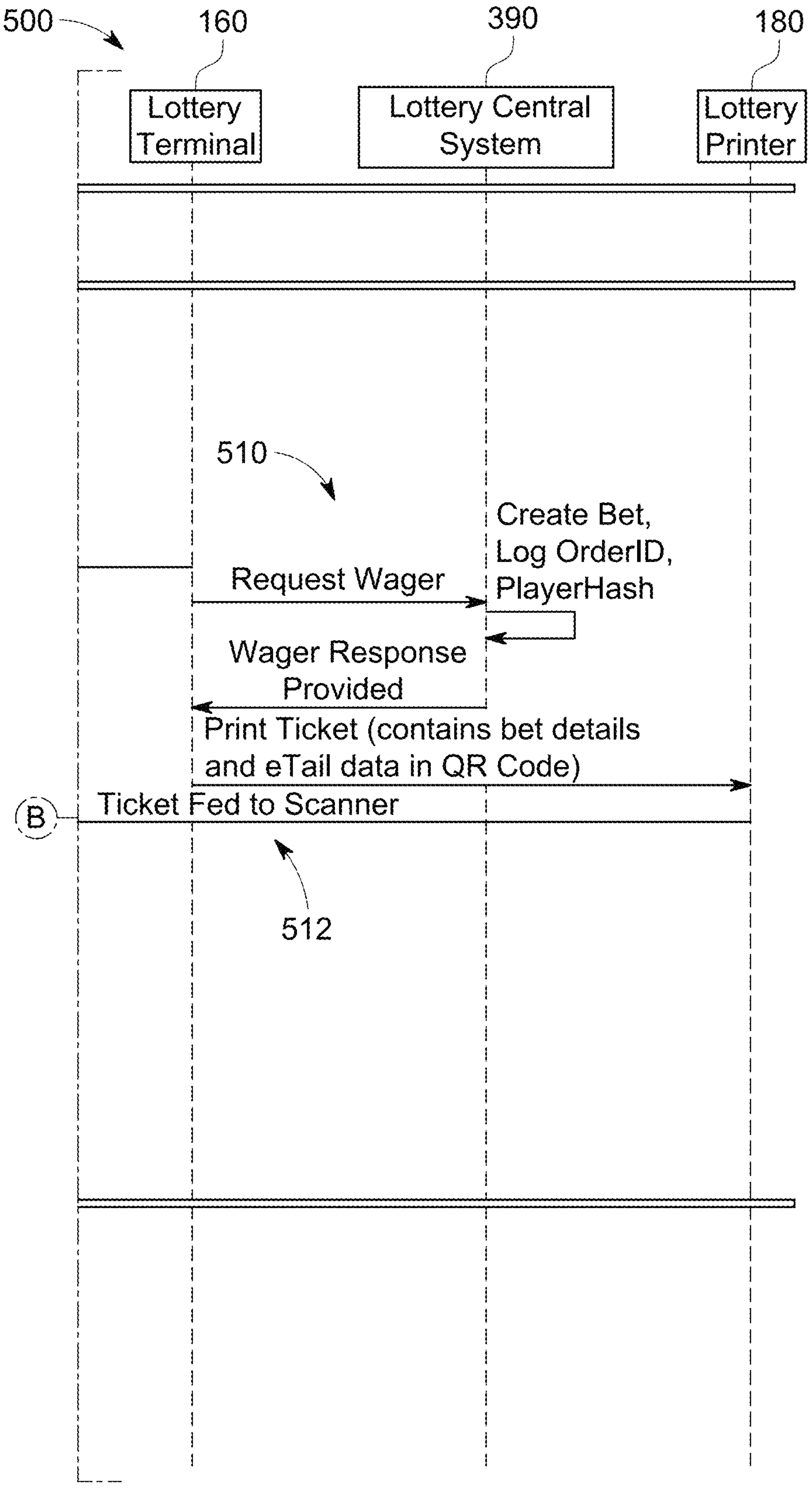

An example method 500 of operation of the lottery ticket selling system 300 for a draw lottery ticket purchase in accordance with one example embodiment of the present disclosure is shown in FIG. 5 and described below.

Figure 6:
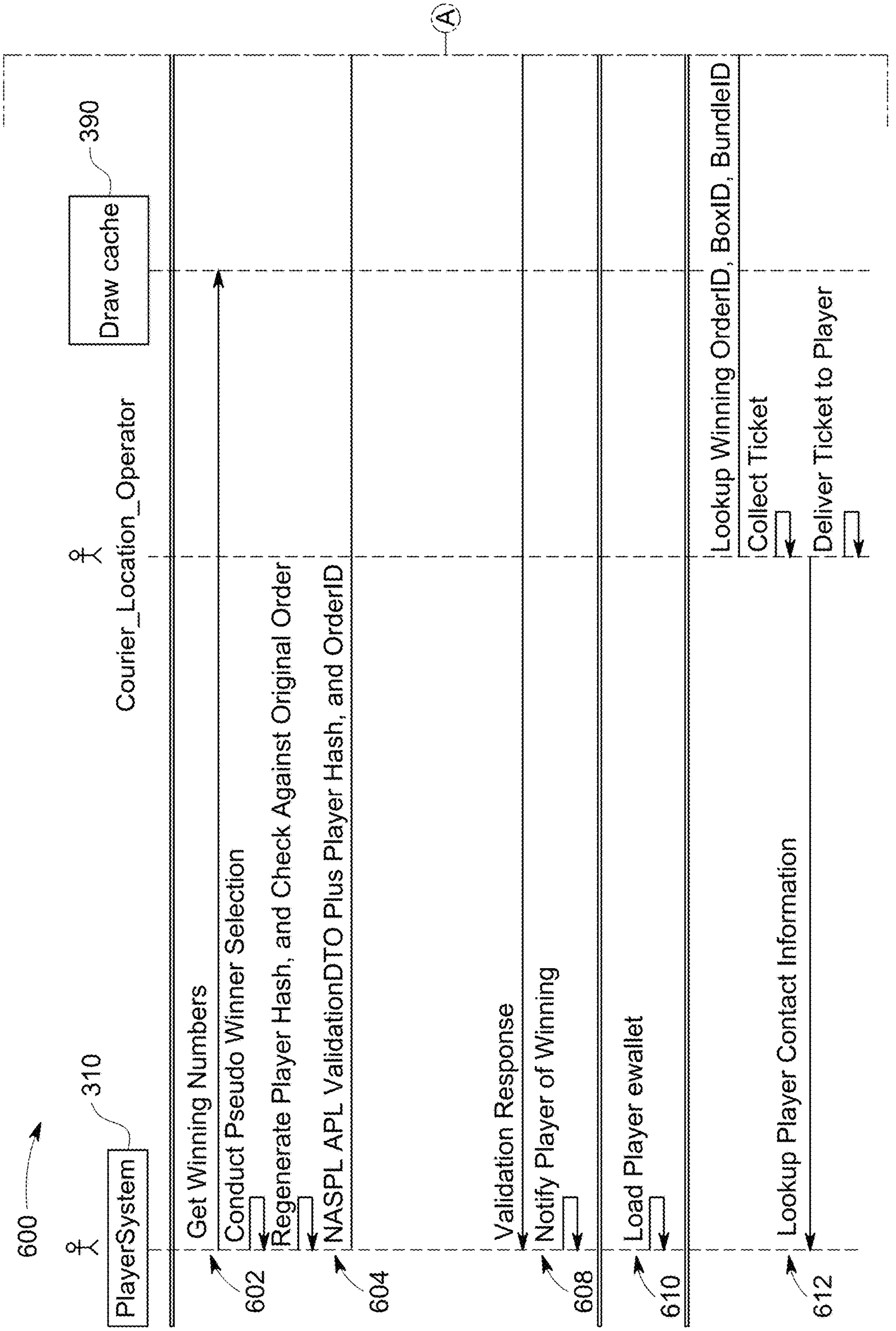
FIG. 6 is a flow diagram showing an example method of operation of the lottery ticket selling system of FIG. 3A for validating a draw lottery ticket and providing a winning amount for that winning draw lottery ticket in accordance with one example embodiment of the present disclosure.
Figure 6:
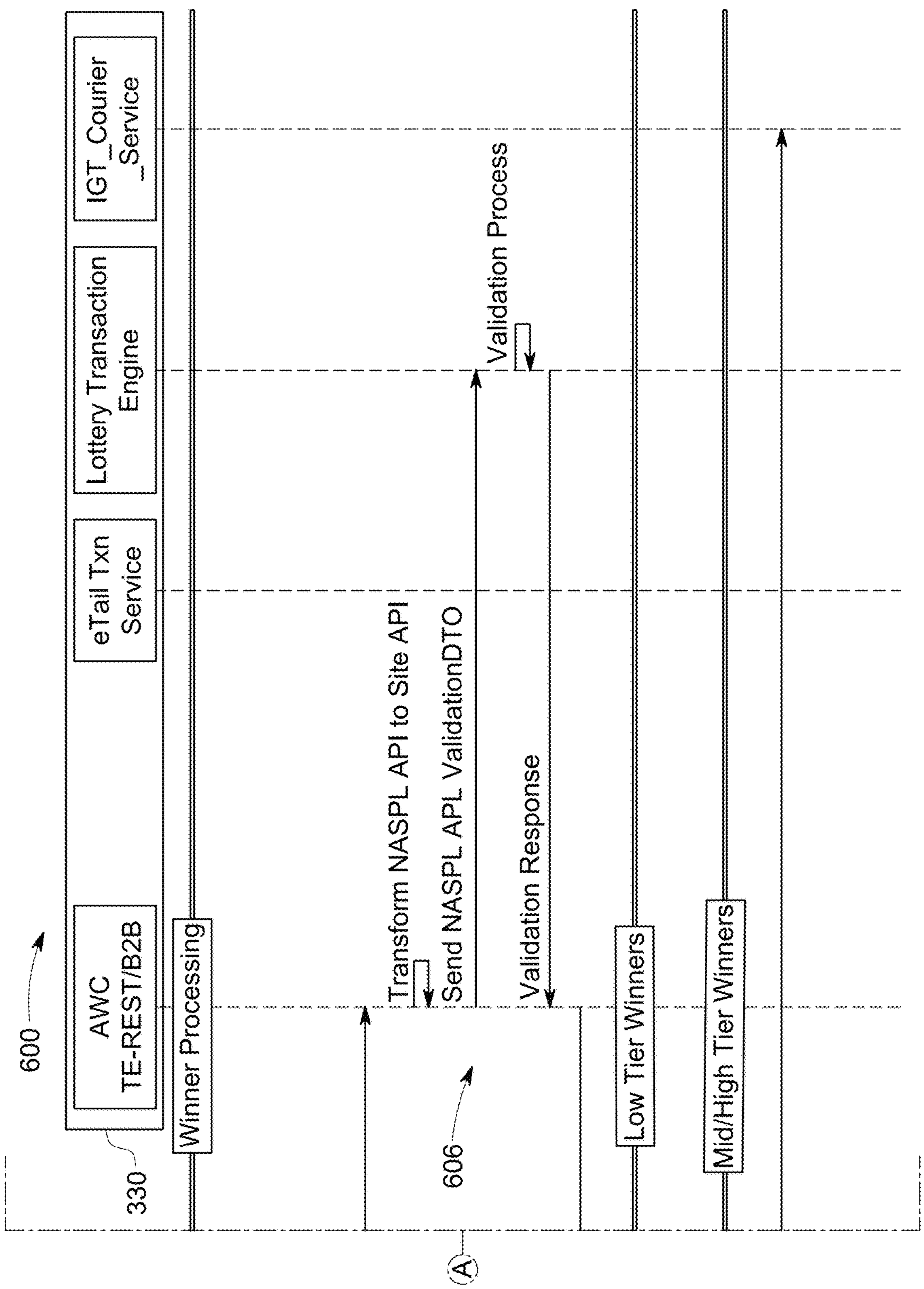

An example method 600 of operation of the lottery ticket selling system 300 for validating a draw lottery ticket and providing a winning amount for that winning draw lottery ticket in accordance with one example embodiment of the present disclosure is shown in FIG. 6 and described below.

While these various embodiments of the present disclosure relate to an electronic ticket retail server or courier server (and related systems and methods), the present disclosure can be employed with other suitable servers, system, and methods that are not courier related.

This illustrated example embodiment of the present disclosure provides the lottery ticket selling system 300 including: (a) a player system 310; (b) an electronic ticket retail server 330 (also referred to herein as "eTail system 330"); (c) a bet processor 340; (d) a lottery terminal 160; (e) a lottery central system 390; (f) a lottery ticket printer 180; (g) a scanner station 350; (h) a ticket transfer device 360; (i) a ticket feeder device 362; (j) a ticket dispenser device 364; and (k) a bet processor printer 380.

In various embodiments, the lottery ticket selling system 300 includes a ticket tracking system 301 that enables an original purchaser (also sometimes referred to herein as a "player") to employ the player system 310 to remotely electronically purchase one or more draw lottery tickets for one or more draw lottery games without physically visiting a lottery terminal at a retail location. In various embodiments, the ticket tracking system 301 includes a courier system.

Various embodiments of the present disclosure are directed to the bet processor 340 itself and methods of operation thereof.

Various other embodiments of the present disclosure are directed to the eTail system 330 itself and methods of operation thereof.

Various other embodiments of the present disclosure are directed to the eTail system 330 and the bet processor 340 and methods of operation thereof.

Various other embodiments of the present disclosure are directed to the eTail system 330, the bet processor 340, and the scanner station 350 and methods of operation thereof.

Various other embodiments of the present disclosure are directed to the eTail system 330, the bet processor 340, the scanner station 350, and the lottery central system 390 and methods of operation thereof.

In this illustrated example embodiment, the player system 310 and the eTail system 330 are configured to communicate with each other via a suitable data network 320 such as but not limited to a cellular data network or the Internet.

In this illustrated example embodiment, the eTail system 330 and the bet processor 340 are configured to communicate with each other via a suitable data network 322 such as but not limited to a cellular data network or the Internet. In other embodiments, the communication between these components can be via hard wire connection such as a USB connector, via wireless connection such as Bluetooth, or other suitable data connection.

In this illustrated example embodiment, the bet processor 340 and the scanner station 350 are configured to communicate with each other via hard wire connection such as a USB connector or Ethernet connection. In other embodiments, the communication between these components can be via a wireless connection, via the data network 322, or other suitable data connection.

In this illustrated example embodiment, the bet processor 340 and the ticket feeder 362 are configured to communicate with each other via hard wire connection such as a USB connector or Ethernet connection. In other embodiments, the communication between these components can be via a wireless connection, via the data network 322, or other suitable data connection.

In this illustrated example embodiment, the lottery terminal 160 and the code reader 165 are configured to communicate with each other via hard wire such as an USB connector. In other embodiments, the communication between these components can be via a suitable data network. In other embodiments, the lottery ticket printer 180 can be built into the same housing as the lottery terminal 160 and thus be physically connected by hard wires.

In this illustrated example embodiment, the lottery terminal 160 and the lottery ticket printer 180 are configured to communicate with each other via hard wire such as an USB connector. In other embodiments, the communication between these components can be via a suitable data network. In other embodiments, the lottery ticket printer 180 can be built into the same housing as the lottery terminal 160 and thus be physically connected by hard wires.

In this illustrated example embodiment, the lottery terminal 160 and the lottery central system 390 are configured to communicate with each other via a suitable data network 170 such as a cellular data network, the Internet, or a private secure network.

In various embodiments, the player system 310 includes a player electronic device with a mobile application (not shown) downloaded thereon. The player electronic device can include an electronic smartphone, an electronic tablet, an electronic watch, or other suitable electronic computing device with suitable data communication, user input, and display functions. The player system 310 includes a processor (not shown) and a memory device (not shown) that includes instructions that when executed by the processor cause and/or configure the processor to provide functionality as described herein. In various embodiments, the mobile application includes instructions stored in the memory device of the player system 310. In various embodiments, all, or a portion of the functionality of the mobile application can be implemented using application-specific integrated circuits or other suitable hardware. In various embodiments, the mobile application of the player system 310 includes a courier mobile application such as the courier mobile application as described above or any other suitable courier mobile application.

The mobile application of the player system 310 enables a player (e.g., an original purchaser) of the player system 310 to purchase a draw lottery ticket and obtain that purchased draw lottery ticket and/or a ticket purchase trailer for that purchased draw lottery ticket without physically visiting a lottery terminal at a retail location. In various embodiments, the original purchaser obtains the purchased draw lottery ticket as: (a) a printed draw lottery ticket; (b) a digital (or virtual) draw lottery ticket (e.g., ticket image data); or (c) both a printed draw lottery ticket and a digital draw lottery ticket. In some embodiments, the lottery ticket selling system 300 causes each purchased draw lottery ticket to be printed, but printed draw lottery tickets are provided to the original purchaser in only certain scenarios, such as when the purchased draw lottery ticket is identified as a winning draw lottery ticket, when the purchased draw lottery ticket has a winning amount over a threshold (e.g., $600 or more), or when requested by the original purchaser. In some embodiments, the original purchaser receives the digital draw lottery ticket at a first time (e.g., via the mobile application after the purchase) and receives the printed draw lottery ticket at a second, later time (e.g., after the printed draw lottery ticket is identified as a winning draw lottery ticket). In some embodiments, the printed draw lottery ticket is stored (e.g., as part of a courier service), but not physically delivered to the original purchaser (e.g., when the printed draw lottery ticket is not a winning ticket, has a winning amount less than $600, etc.).

In various embodiments, lottery ticket selling system 300 enables the original purchaser to obtain the ticket purchase trailer as: (a) a printed ticket purchase trailer; (b) a digital (or virtual) ticket purchase trailer (e.g., a trailer digital image or trailer image data); or (c) both a printed ticket purchase trailer and a digital ticket purchase trailer. In some embodiments, the lottery ticket selling system 300 causes each ticket purchase trailer to be printed, but printed ticket purchase trailer are provided to the original purchaser in only certain scenarios, such as when the purchased draw lottery ticket associated with that ticket purchase trailer is identified as a winning draw lottery ticket, when the purchased draw lottery ticket has a winning amount over a threshold (e.g., $600 or more), or when requested by the original purchaser. In some embodiments, the original purchaser receives the digital ticket purchase trailer at a first time (e.g., via the mobile application after the purchase) and receives the printed ticket purchase trailer at a second, later time (e.g., after the printed draw lottery ticket is identified as a winning draw lottery ticket). In some embodiments, the printed ticket purchase trailer is stored (e.g., as part of a courier service), but not physically delivered to the original purchaser (e.g., when the printed draw lottery ticket is not a winning ticket, has a winning amount less than $600, etc.).

In various embodiments, the mobile application is configured to: (a) enable a player to use the mobile application on the player system 310 to set up a player account with the eTail system 330; (b) deposit funds to the player account; (c) withdraw funds from the player account; (d) use funds in the player account to purchase a draw lottery ticket for a draw lottery game; (e) generate a lottery ticket order (such as a lottery ticket order 370) for the purchase of the draw lottery ticket; (f) cause the player system 310 to send the lottery ticket order to the eTail system 330; (g) view ticket details for the purchased draw lottery ticket; and/or (h) view images of the purchased draw lottery ticket and/or ticket purchase trailer.

In various embodiments, the eTail system 330 includes a processor 332, a memory device 334 including instructions that when executed by the processor 332 cause and/or configure the processor 332 to provide at least the functionality as described herein, an eTail application 335, an eTail transmission service 336, a transaction engine 337, and a random number generator 338. In various embodiments, the eTail application 335, the eTail transmission service 336, the transaction engine 337, and/or the random number generator 338 include instructions stored in the memory device 334. The processor 332 may be referred to as a "server processor" herein for clarity but is not limited to server processors or server class processors and can include any suitable processor. The memory device 334 may be referred to as a "server memory device" herein for clarity but is not limited to server memory devices or server class memory devices and can include any suitable memory device. In various embodiments, all, or a portion of the functionality of the eTail system 330 can be implemented using application-specific integrated circuits or other suitable hardware. In various embodiments, the eTail system 330 includes a courier server, such as the courier server 130, located at a suitable courier processing center (not shown).

In various embodiments, the eTail application 335 is configured to enable communication between the player system 310 and the eTail system 330.

In various embodiments, the eTail transmission service 336 is configured to enable communication between the bet processor 340 and the eTail system 330.

In various embodiments, the transaction engine 337 is configured to enable communication between the eTail system 330 and the lottery central system 390.

In various embodiments, the random number generator 338 is configured to randomly select player numbers for a draw lottery ticket responsive to a quick pick indication by the player.

In various embodiments, the eTail system 330 is configured to generate a ticket purchase identifier. In various embodiments, the ticket purchase identifier includes an eTail system identifier and an original purchaser identifier, as described herein. In various embodiments, the ticket purchase identifier is employable to associate a draw lottery ticket (purchased draw lottery ticket or printed draw lottery ticket) with an original purchaser of that draw lottery ticket. The ticket purchase identifier can also or alternatively associate that draw lottery ticket with an original purchaser account that can facilitate identification of that original purchaser. That is, an identity of the original purchaser of the player system 310 is identifiable using the ticket purchase identifier. The eTail system 330 generates the ticket purchase identifier for the draw lottery ticket prior to a purchase of that draw lottery ticket.

In various embodiments, the ticket purchase identifier includes a field or string of data. In some embodiments, the field includes a first sub-field for the eTail system identifier and a second sub-field for the original purchaser identifier. In some embodiments, different eTail systems employ different lengths of the first and second sub-fields. In various embodiments, the ticket purchase identifier includes other suitable information that is associated with a courier service, such as an order ID associated with the lottery ticket order 370, a bundle ID associated with a bundle of printed draw lottery tickets, and/or a digital fingerprint associated with the original purchaser. In various embodiments, the ticket purchase identifier is independent from data associated with the lottery central system 390.

In various embodiments, the eTail system 330 is configured to: (a) receive a lottery ticket order (such as the lottery ticket order 370) from the player system 310; (b) generate a bet slip data (such as a bet slip data 371) for a purchase of a draw lottery ticket based on the lottery ticket order; (c) send the bet slip data to the bet processor 340 to enable the generation and display of a digital bet slip QR code (such as a digital bet slip QR code 372) that in turn enables the purchase of the draw lottery ticket; (d) receive image data for the draw lottery ticket and/or image data for the ticket purchase trailer; and/or (e) provide the ticket details, the image data for the draw lottery ticket, and/or the image data for the ticket purchase trailer to the player system 310.

In various embodiments, the eTail system 330 is configured to enable a courier service, for example, to deposit funds to a player account, to withdraw funds from the player account, and to use funds in the player account to purchase a draw lottery ticket for a lottery game.

In various embodiments, the eTail system 330 can randomly select player numbers for a draw lottery ticket responsive to a quick pick indication by the player.

In various embodiments, the eTail system 330 generates the digital bet slip QR code based on the lottery ticket order and sends the digital bet slip QR code to the bet processor 340.

In various embodiments, the eTail system 330 generates the bet slip as a physical paper bet slip that is scannable by the code reader 165.

In various embodiments, the bet processor 340 includes a processor 342, a memory device 344, and a bet processor application 346. In some embodiments, the bet processor 340 includes or is associated with a display device 348 (such as an LCD or OLED display). The memory device 344 includes instructions that when executed by the processor 342 cause and/or configure the processor 342 to provide functionality as described herein. In various embodiments, the bet processor application 346 includes instructions stored in the memory device 344. The processor 342 may be referred to as a "bet trailer processor" herein for clarity. The memory device 344 may be referred to as a "bet trailer memory device" herein for clarity. In various embodiments, all, or a portion of the functionality of the bet processor 340 can be implemented using application-specific integrated circuits or other suitable hardware. In various embodiments, the bet processor 340 includes a tablet device or other suitable computing device that includes the processor 342, the memory device 344, and the display device 348 in a same housing. In other embodiments, the bet processor 340 includes the processor 342 and the memory device 344 in a same housing and the display device 348 is a separate device (e.g., connected via a hardwire).

The bet processor application 346 is configured to enable communication between the bet processor 340 and the eTail system 330.

In various embodiments, the bet processor 340 generates a ticket purchase trailer, such as a ticket purchase trailer 389, that is associated with a draw lottery ticket (purchased draw lottery ticket or printed draw lottery ticket). In various embodiments, the ticket purchase trailer includes: (1) the ticket purchase identifier for that draw lottery ticket; (2) ticket details associated with that draw lottery ticket (e.g., the ticket serial number, the player numbers); and/or other suitable ticket information. In various embodiments, the ticket purchase trailer includes a QR code, a barcode, an image, or information in another suitable format.

Since the ticket purchase trailer includes the ticket details and the ticket purchase identifier, the ticket purchase trailer associates a purchased draw lottery ticket with the original purchaser, who is identifiable from the ticket purchase identifier. In various embodiments, the ticket purchase trailer enables validation of the purchased draw lottery ticket. In some such embodiments, the ticket purchase trailer enables validation of the purchased draw lottery ticket without a printing of a validation receipt (e.g., enabling an electronic validation).

The bet processor 340 is configured to: (a) receive a bet slip data (such as the bet slip data 371) from the eTail system 330; (b) receive a ticket purchase identifier from the eTail system 330; (c) generate and display a digital bet slip (such as the digital bet slip QR code 372) on the display device 348 to enable the lottery terminal 160 to employ the code reader 165 to scan the displayed digital bet slip; (d) cause the scanner station 350 to scan a printed draw lottery ticket (such as the printed draw lottery ticket 378) to obtain scanned ticket image data; (e) obtain ticket details from the scanned ticket image data; (f) generate a ticket purchase trailer to include the ticket purchase identifier; (g) generate a combined ticket and trailer image that includes the scanned ticket image data and the ticket purchase trailer; and/or (h) provide the combined ticket and trailer image to the eTail system 330.

In various embodiments, the bet processor 340 generates the ticket purchase trailer by generating image data (referred to herein as "trailer image data" or a "trailer digital image"). In various embodiments, the bet processor 340 generates the trailer image data to be appended to the ticket image data received from the scanner station 350. In some such embodiments, the bet processor 340 generates and provides a single image (e.g., a combined ticket and trailer image) that includes the ticket image data and the trailer image data (e.g., appended to the ticket image data and/or combined without modifying the ticket image data). In some such embodiments, the combined ticket and trailer image has a different pixel aspect ratio from the ticket image data. As one example where the ticket image data has a pixel size of 100×200 pixels (aspect ratio 1:2) and the trailer image data has a pixel size of 100×30 pixels, the combined ticket and trailer image has a pixel size of 100×230 pixels (aspect ratio 1:2.3). As another example where the ticket image data has a pixel size of 100×200 pixels (aspect ratio 1:2) and the trailer image data has a pixel size of 40×200 pixels, the combined ticket and trailer image has a pixel size of 140×200 pixels (aspect ratio 1:1.43).

In various embodiments, the scanner station 350 includes a lottery ticket scanner having a housing (not shown), a processor (not shown) supported by the housing, a memory device (not shown) supported by the housing, and an image capture device 352 supported by the housing. In various embodiments, the image capture device 352 includes a charge coupled device (CCD) image sensor, an active pixel sensor, and/or other suitable digital image sensor. In various embodiments, the housing includes a ticket inlet (not shown) configured to receive a printed draw lottery ticket and/or a ticket outlet (not shown) configured to dispense a printed draw lottery ticket after scanning.

The image capture device 352 is configured to: (a) capture scanned ticket image data for a front surface and/or a rear surface of a printed draw lottery ticket; and (b) provide the scanned ticket image data to the bet processor 340. In various embodiments, the image capture device 352 is configured to capture the ticket image data as still image(s) of the printed draw lottery ticket. In various embodiments, the image capture device 352 can include a digital camera, is not a video camera, or is not configured to capture video of the printed draw lottery ticket. In such embodiments, the ticket image data is relatively small in size as compared to video data that might be captured by a video camera. In such embodiments, the ticket image data is readily transmitted via the data network 322 (e.g., using less bandwidth, having a reduced transmission time, and using reduced processing resources). In various embodiments, the scanner station 350 includes an additional image capture device (not shown) configured to capture the ticket image data for the rear surface of the printed draw lottery ticket. In such embodiments, the image capture device 352 captures ticket image data for the front surface of the printed draw lottery ticket.

In various embodiments, the scanner station 350 includes one or more mirrors (not shown) or other reflective surfaces to enable the image capture device 352 to capture the ticket image data. In various embodiments, the scanner station 350 includes additional actuators (not shown) that are configured to present both the front surface and the rear surface of the printed draw lottery ticket to the image capture device 352, for example, by flipping the printed draw lottery ticket over, moving and/or rotating the image capture device 352, and/or moving the mirrors.

In various embodiments, the ticket transfer device 360 includes: (a) a transfer housing (not shown); (b) a plurality of roll engagers (not shown) supported by the transfer housing; and/or (c) a controller (not shown). In various embodiments, the transfer housing includes a ticket inlet (not shown) configured to receive a printed draw lottery ticket (e.g., from the lottery ticket printer 180) and/or a ticket outlet (not shown) configured to dispense a printed draw lottery ticket. In various embodiments, the ticket transfer device 360 is configured to transfer printed draw lottery tickets from the lottery ticket printer 180 to the ticket feeder device 362. In various embodiments, the ticket transfer device 360 transfers one printed lottery ticket at a time. In various embodiments, the ticket transfer device 360 transfers a plurality of printed lottery tickets at a time, such as a printed lottery ticket roll (e.g., printed draw lottery tickets that have not been separated from each other) or a stack of printed draw lottery tickets.

In various embodiments, the ticket feeder device 362 includes: (a) a feeder housing 363*a*; (b) a plurality of roll engagers 363*b* supported by the feeder housing 363*a*; and/or (c) a controller (not shown). In various embodiments, the feeder housing 363*a* includes a ticket inlet (not shown) configured to receive a printed draw lottery ticket and/or a ticket outlet (not shown) configured to dispense a printed draw lottery ticket. In various embodiments, the ticket feeder device 362 is configured to receive printed draw lottery tickets from the ticket transfer device 360 and feed those tickets to the scanner station 350. In various embodiments, the ticket feeder device 362 transfers one printed lottery ticket at a time. In various embodiments, the ticket feeder device 362 transfers a plurality of printed lottery tickets at a time, such as a printed lottery ticket roll (e.g., printed draw lottery tickets that have not been separated from each other) or a stack of printed draw lottery tickets.

In various embodiments, the ticket dispenser device 364 includes: (a) a dispenser housing (not shown); (b) a plurality of roll engagers (not shown) supported by the dispenser housing; and/or (c) a controller (not shown). In various embodiments, the dispenser housing includes a ticket inlet (not shown) configured to receive a printed draw lottery ticket and/or a ticket outlet (not shown) configured to dispense a printed draw lottery ticket. In various embodiments, the ticket dispenser device 364 is configured to receive printed draw lottery tickets from the scanner station 350 and dispense those tickets for storage (e.g., by a courier processing clerk). In various embodiments, the ticket dispenser device 364 transfers one printed lottery ticket at a time. In various embodiments, the ticket dispenser device 364 transfers a plurality of printed lottery tickets at a time, such as a printed lottery ticket roll (e.g., printed draw lottery tickets that have not been separated from each other) or a stack of printed draw lottery tickets.

In various embodiments, the bet processor printer 380 includes: (a) a printer housing (not shown); (b) a supply paper holder (not shown); (c) a plurality of roll engagers (not shown) supported by the printer housing; and/or (d) a controller (not shown). In various embodiments, the bet processor printer 380 is configured to print box identifiers and/or batch identifiers (e.g., labels) for boxes of printed draw lottery tickets to be stored. In various embodiments, these labels facilitate locating previously printed and stored draw lottery tickets.

The lottery terminal 160 includes a processor (not shown), and a memory device (not shown). The lottery terminal 160 is associated with the code reader 165. The memory device includes instructions that when executed by the processor cause and/or configure the processor to provide functionality as described herein. In various embodiments, the code reader 165 includes a quick response (QR) code reader, a barcode reader, an image capture device, CIS reader, or other suitable reader. In some embodiments, the code reader 165 is incorporated into a housing (not shown) of the lottery terminal 160.

In various embodiments, the lottery terminal 160 is configured to: (a) employ the code reader 165 to scan a bet slip (such as the digital bet slip QR code 372) to obtain scanned bet slip data; (b) generate a bet request (such as a bet request 374) based on the scanned bet slip data; (c) send the bet request to the lottery central system 390 to cause a purchase of a draw lottery ticket based on the scanned bet slip data; (d) receive a bet response from the lottery central system 390 (such as a bet response 376); and/or (e) cause the lottery ticket printer 180 to print the purchased draw lottery ticket (such as the printed draw lottery ticket 378 and/or 410) based on the bet response.

In various embodiments, the lottery terminal 160 generates and provides a lottery ticket printing request to the lottery ticket printer 180 to cause the purchased draw lottery ticket to be printed. The lottery ticket printing request includes ticket details for the purchased draw lottery ticket. The ticket details can include a ticket identifier and/or serial number, an indication of the draw lottery game, the date of the play of the draw lottery game that the draw lottery ticket relates to, and the player numbers for the play of the draw lottery game.

The lottery ticket printer 180 includes: (a) a printer housing 182; (b) a supply paper holder 184; (c) a plurality of roll engagers (not shown) supported by the printer housing; and (d) a controller (not shown). The lottery ticket printer 180 is configured to print draw lottery tickets, such as a printed draw lottery ticket 378. In various embodiments, the lottery ticket printer 180 receives a lottery ticket printing request (or lottery ticket image) associated with a draw lottery ticket and prints that draw lottery ticket. In various such embodiments, the lottery ticket printer 180 receives the lottery ticket printing request from the lottery terminal 160 and/or the lottery central system 390.

The lottery central system 390 includes a processor (not shown) and a memory device (not shown). The memory device includes instructions that when executed by the processor cause and/or configure the processor to provide functionality as described herein. In various embodiments, the lottery central system 390 includes a server or other suitable computing device. In various embodiments, all, or a portion of the functionality of the lottery central system 390 can be implemented using application-specific integrated circuits or other suitable hardware. In various embodiments, the lottery central system 390 includes the lottery central system 200.

In various embodiments, the lottery central system 390 is configured to: (a) receive a bet request (such as the bet request 374) for the purchase of a draw lottery ticket from the lottery terminal 160; (b) obtain bet details for the purchase from the bet request; (c) randomly select draw numbers for the bet request (e.g., for a quick pick indication); (d) generate a bet for the purchase of a draw lottery ticket based on the bet details; (e) log (such as store) the bet; (f) generate and send a bet response (such as the bet response 376) for the bet request to the lottery terminal 160; (g) process lottery ticket redemption requests for draw lottery tickets; and/or (h) other lottery ticket related functionality.

In various embodiments, the lottery central system 390 enables communication with the eTail system 330 (e.g., via the transaction engine 337) and/or the player system 310. In various embodiments, the lottery central system 390 is configured to: (a) store and/or hosts a draw cache that includes winning ticket information; (b) receive a validation request for validating a draw lottery ticket; and/or (c) sending a validation response for a winning draw lottery ticket that includes an indication of a winning amount for that winning draw lottery ticket.

In various embodiments, the bet processor 340, the eTail system 330, and/or the ticket tracking system 301 enable generation of the ticket purchase trailer without modification to the lottery terminal 160, the lottery ticket printer 180, and/or the printed draw lottery ticket 378. In other words, the lottery terminal 160, the lottery ticket printer 180, and the printed draw lottery ticket 378 as employed by the lottery ticket selling system 300 are not modified from known systems, such as the courier system 100. In various embodiments, the bet processor 340, the eTail system 330, and/or the ticket tracking system 301 enable generation of the ticket purchase trailer without modification to the lottery central system 200. In other words, the lottery central system 390 as employed by the lottery ticket selling system 300 is not modified from known systems, such as the lottery central system 200.

In this example embodiment and as seen in FIG. 3B, the combined ticket and trailer image 384 (shown as "augmented ticket image data") employed by the lottery ticket selling system 300 includes the ticket details 379 (shown as "Draw Ticket") and the ticket purchase trailer 389. In various embodiments, the ticket purchase trailer 389 includes information having a human readable format within the combined ticket and trailer image 384, such as a text format or image format. In various embodiments, the ticket purchase trailer 389 includes information having a format that is not readily human readable, such as an encoded format (e.g., a barcode or QR code) or encrypted format. In various embodiments, the combined ticket and trailer image 384 includes at least some information in a human readable format and at least some information in a format that is not readily human readable. In some such embodiments, the combined ticket and trailer image 384 includes at least some information in both a human readable format and a format that is not readily human readable (e.g., a ticket serial number provided as plain text and as a barcode).

In this example embodiment, the ticket purchase trailer 389 includes a QR code. In various embodiments, the ticket purchase trailer 389 includes the ticket purchase identifier. In various embodiments, the ticket purchase trailer 389 includes the ticket purchase identifier, the ticket details for the printed draw lottery ticket 378, and/or other suitable information. In various embodiments, the ticket purchase trailer 389 is different from the digital bet slip QR code 372. In some such embodiments, the ticket purchase trailer 389 includes the ticket serial number (e.g., ticket identifier 18) or other suitable information that was not included in the digital bet slip QR code 372. In some such embodiments, the ticket purchase trailer 389 includes information that was not yet generated by the lottery central system 390 or was unavailable to the bet processor 340 and/or eTail system 330 when the digital bet slip QR code 372 was generated.

Referring now to FIG. 3B and FIG. 4, an example method 400 of purchasing a draw lottery ticket using the lottery ticket selling system 300 is now described. Although the method is described with reference to the flowchart shown in FIG. 4, other methods of performing the acts associated with this illustrated process may be employed. For example, the order of certain of the illustrated blocks may be changed, certain of the illustrated blocks may be optional, or certain of the illustrated blocks may not be employed.

In this example system and method for purchasing a draw lottery ticket, the player system 310 sends a request to assign, reserve, and/or lock a bet processor (such as the bet processor 340) for the purchase of a draw lottery ticket, as indicated at block 402. In various embodiments, the eTail system 330 causes the lottery ticket printer 180, the ticket feeder 362, and/or the scanner station 350 to be locked in addition to the bet processor 340. In various embodiments, the mobile application of the player system 310 enables a player (i.e., an original purchaser) to input the player's selected numbers or a quick pick indication for a draw lottery ticket for a draw lottery game that the player wishes to purchase and thus play (such as by interacting with a graphical user interface, scanning a new or previously used bet slip or draw lottery ticket, scanning a ticket purchase trailer from another purchased draw lottery ticket, or identifying a previously purchased draw lottery ticket with player numbers for repurchase).

In various embodiments, the player system 310 generates a lottery ticket order 370 as a wager request in association with the request for the bet processor 340. In various embodiments, the wager request includes bet details (e.g., order details) for the purchase of the draw lottery ticket. The bet details can include a requested draw game identifier that identifies a lottery game type, a requested draw date (e.g., the "boards" to be played), the player selected numbers, player numbers selected by the player system 310, and/or the quick pick indication. The player system 310 sends the lottery ticket order 370 to the eTail system 330 via the data network 320 (FIG. 3A).

In various embodiments and/or scenarios, the mobile application generates the lottery ticket order request to include: (1) ticket information for a single draw lottery ticket; (2) ticket information for multiple draw lottery tickets for a same lottery game and for a same player; and/or (3) ticket information for multiple draw lottery tickets for different lottery games for a same player. In other words, the lottery ticket order request can be associated with one, two, three, or more draw lottery tickets for one, two, three or more draw lottery games.

The eTail system 330 receives the lottery ticket order 370 from the player system 310 and sends the bet details to the bet processor 340, as indicated at block 404. In various embodiments, the eTail system 330 generates a ticket purchase identifier prior to the purchase of the draw lottery ticket, which enables tracking of the purchased draw lottery ticket and/or association of the purchased draw lottery ticket with the original purchaser (or original purchaser account). In some embodiments, the ticket purchase identifier enables a complete mapping of the purchase, including a lottery ticket order, a digital bet slip, a bet request, a stored bet for purchased draw lottery ticket, a bet response, and a printed draw lottery ticket In various embodiments, the eTail system 330 generates bet slip data 371 to include the bet details and the ticket purchase identifier and sends the bet slip data 371 to the bet processor 340. In some embodiments, the eTail system 330 randomly selects player numbers for the bet slip data 371, for example, based on a quick pick indication within the lottery ticket order 370.

In various embodiments, the ticket purchase identifier includes an eTail system identifier associated with an operator of the eTail system 330 and/or an original purchaser identifier associated with the original purchaser. The eTail system identifier enables identification of the operator of the eTail system 330 through which the bet slip data 371 was received. The original purchaser identifier enables identification of the original purchaser and/or original purchaser account. In various embodiments, the eTail system 330 provides a courier service with a player account for the original purchaser and the ticket purchase identifier is referred to herein as a "courier string". In various embodiments, different eTail systems employ different courier strings.

In various embodiments, the original purchaser identifier includes an original purchaser digital signature, such as a data structure, data file, data bit sequence, data token, or other suitable digital identifier, that does not by itself uniquely identify the original purchaser, but can be used to uniquely identify the original purchaser using a suitable cryptographic function. In various embodiments, the cryptographic function includes a hash function, a keyed hash function, an encryption function, a decryption function, or other suitable cryptographic function. In various embodiments, the eTail system 330 (or another suitable entity) employs original purchaser identifying information as a parameter or input to the cryptographic function to generate the original purchaser identifier. In some such embodiments, the original purchaser identifier is not readily human readable. In some other embodiments, the original purchaser identifier includes a human readable identifier that uniquely identifies the original purchaser (i.e., without the use of the cryptographic function).

In various embodiments, the original purchaser identifier includes a hash string based on the original purchaser identifying information. In such embodiments, identification and/or verification of the original purchaser is performed by the original purchaser providing the original purchaser identifying information to regenerate the original purchaser identifier (e.g., when redeeming a winning draw lottery ticket). In various embodiments, the original purchaser identifier includes encrypted data, such as an encrypted copy of the original purchaser identifying information (or other suitable data) generated using an encryption key (such as a public key). In such embodiments, the identification and/or verification of the original purchaser is performed by the original purchaser providing a decryption key (such as a private key) associated with the original purchaser to enable decryption of the encrypted data.

In various embodiments, original purchaser identifying information can include, for example: (1) the original purchaser's full name, residential address, and phone number; (2) Government-issued ID number (e.g., social security number, license number, passport number, tax identifier); (3) a biometric and/or physical identifier (e.g., thumbprint); (4) a suitable account number (e.g., bank account number, utility account number); (5) a group ID number or identifier; (6) a group member identifier; (7) the answers to 'challenge' questions, such as the player's first pet, where the player was born, etc.; and/or (8) or other suitable personal identifying information (PII).

In various embodiments, for example, the original purchaser provides their tax identifier and a challenge question answer to the eTail system 330 for generation of the original purchaser identifier as a hash of the tax identifier and the challenge question answer. In such embodiments, the original purchaser provides the same tax identifier and challenge question answer when redeeming a winning draw lottery ticket to re-generate the original purchaser identifier and authenticate the original purchaser.

The bet processor 340 generates and displays a digital bet slip on the display device 348, as indicated at block 406. The digital bet slip is employable by the lottery terminal 160 to cause a purchase of a draw lottery ticket based on the bet details. In this example embodiment, the digital bet slip includes the digital bet slip QR code 372. In various embodiments, the bet processor 340 encodes the bet details from the bet slip data 371 and/or other suitable ticket information into the digital bet slip QR code 372. In various embodiments, the digital bet slip QR code 372 improves the speed at which the bet details and ticket purchase identifier can be scanned, for example, by providing a single scan region from which the bet details can be scanned, instead of multiple distinct regions for each field of the bet details (i.e., a player number region, a game type region, a draw date region, etc.). In some embodiments, the digital bet slip QR code 372 enables error detection and/or error correction when scanning the bet details. In some embodiments, the display device 348 is positioned and/or oriented to enable the code reader 165 to automatically scan the displayed digital bet slip QR code 372. In some embodiments, the display device 348 is positioned and/or oriented to enable a courier processing clerk to employ the code reader 165 to scan the displayed digital bet slip QR code 372.

The code reader 165 associated with the lottery terminal 160 scans the digital bet slip QR code 372 from the bet processor 340, provides the bet details to the lottery central system 390, and receives ticket details for a purchased draw lottery ticket, as indicated at block 408. That is, the lottery terminal 160 employs the code reader 165 to scan the displayed digital bet slip QR code 372 to obtain scanned bet slip data. In various embodiments, the lottery terminal 160 generates a bet request 374 for the purchase of the draw lottery ticket and the bet request 374 includes the bet details based on the scanned bet slip data. The lottery terminal 160 sends the bet request 374 to the lottery central system 390 via the data network 170 (FIG. 2) to cause the purchase of the draw lottery ticket based on the scanned bet slip data.

In various embodiments, the lottery central system 390 receives the bet request 374 and obtains the bet details. The lottery central system 390 creates a bet for the purchased draw lottery ticket based on the bet details and logs the bet. The bet includes ticket details for the purchased draw lottery ticket, such as a ticket serial number (e.g., ticket identifier 18), player numbers, a security code that facilitates authentication of the purchased draw lottery ticket, or other suitable ticket information. In various embodiments, the ticket purchase identifier generated by the eTail system 330 is independent from the ticket details. In various embodiments, a valid draw lottery ticket includes only ticket details, such as when purchased from the courier server 130 or lottery terminal 160.

After creation of the bet, the lottery central system 390 generates and provides a bet response 376 to the lottery terminal 160. In various embodiments, the bet response 376 includes a confirmation of the purchase of the draw lottery ticket and/or other suitable ticket information. In various embodiments, the confirmation includes the ticket details for the draw lottery ticket, such as the ticket serial number and player numbers.

The lottery terminal 160 prints the purchased draw lottery ticket (shown as printed draw lottery ticket 378) including the bet details and/or the ticket details, as indicated at block 410. In various embodiments, the lottery terminal 160 obtains the bet details (e.g., the game identifier, the draw date, the player numbers) and/or the ticket details (e.g., the ticket serial number) from the bet response 376 and causes the lottery ticket printer 180 to print the printed draw lottery ticket 378. The printed draw lottery ticket 378 includes the ticket details from the bet response 376, shown as ticket details 379 ("Draw Ticket"). In various embodiments, the lottery terminal 160 generates and provides lottery ticket printing data (e.g., printer commands, image data, etc.) to the lottery ticket printer 180 to cause the printed draw lottery ticket 378 to be printed.

The ticket feeder 362 transfer the printed draw lottery ticket 378 to the scanner station 350, as indicated at block 412. In various embodiments, the ticket transfer device 360 transfers the printed draw lottery ticket 378 from the lottery ticket printer 180 to the ticket feeder device 362. In various embodiments, the ticket feeder device 362 includes the ticket transfer device 360 (e.g., within the housing 363*a*). In various embodiments, the ticket transfer device 360 is omitted and a courier processing clerk transfer the printed draw lottery ticket 378 to the ticket feeder device 352.

The scanner station 350 scans the front and back of the printed draw lottery ticket 378 to create digital images (e.g., ticket digital images or ticket image data 382) and provides the digital images to the bet processor 340, as indicated at block 414. In various embodiments, the bet processor 340 causes the scanner station 350 to scan the printed draw lottery ticket 378. In various embodiments, the scanner station 350 automatically scans the printed draw lottery ticket 378, for example, when the printed draw lottery ticket 378 is placed and/or fed into the ticket inlet of the scanner station 350. In some embodiments, the bet processor 340, alternatively or in addition to the scanner station 350, scans the front and back of the printed draw lottery ticket 378 to create the digital images.

The bet processor 340 reads the ticket details from the ticket digital images, generates a ticket purchase trailer, and sends the ticket digital images and ticket purchase trailer to the eTail system 330, as indicated at block 416. In various embodiments, the bet processor 340 obtains the ticket details for the purchased draw lottery ticket from the ticket image data 382 (e.g., using optical character recognition) and generates the ticket purchase trailer 389 based on the ticket details. As described above, the ticket purchase trailer 389 can include a QR code, a barcode, an image, or information in another suitable format. As described above, the ticket purchase trailer includes the ticket purchase identifier (e.g., received with the bet slip data 371 from the eTail system 330).

In various embodiments, the bet processor 340 generates a combined ticket and trailer image that includes the ticket image data 382 and the ticket purchase trailer 389 and sends the combined ticket and trailer image to the eTail system 330 (e.g., as a single image). In various embodiments, the combined ticket and trailer image is different from the printed draw lottery ticket 378 (e.g., at least by including the ticket purchase trailer 389 which is not included on the printed draw lottery ticket 378). In various embodiments, the bet processor 340 generates the ticket purchase trailer as a trailer digital image and sends the trailer digital image and ticket digital images to the eTail system 330 (e.g., as separate images).

In various embodiments, the eTail system 330 employs the digital images to confirm the bet details and the ticket details. In various embodiments, the eTail system 330 obtains the ticket details for the purchased draw lottery ticket from the ticket image data 382 (e.g., using optical character recognition). The eTail system 330 compares the ticket details with the bet details from the digital bet slip QR code 372 to ensure that the purchased draw lottery ticket 378 matches the lottery ticket order 370 of the original purchaser (i.e., matching player numbers, matching draw date, etc.). In other words, the eTail system 330 validates that the lottery ticket order 370 has been properly fulfilled.

The eTail system 330 sends the ticket image data 382 and ticket purchase trailer 389 to the player system 310, enabling the player system 310 to display a play experience for the purchased draw lottery ticket, as indicated at block 418. In various embodiments, the ticket image data 382 and the ticket purchase trailer 389

In various embodiments, the bet processor 340 generates the trailer image data to be stored and/or written over a portion of the ticket image data. In other words, the bet processor 340 generates the combined ticket and trailer image by modifying the ticket image data to include the trailer image data without changing a pixel aspect ratio of the ticket image data and/or changing a pixel size of the ticket image data. As one example where the ticket image data has a pixel size of 100×200 pixels (aspect ratio 1:2) and the trailer image data has a pixel size of 100×30 pixels, the augmented ticket and trailer image has a pixel size of 100×200 pixels (aspect ratio 1:2).

In various embodiments, the bet processor 340 generates the trailer image data to be separate from the ticket image data received from the scanner station 350. In some such embodiments, the bet processor 340 provides the ticket purchase trailer to the player system 310 as a trailer digital image and provides the purchased draw lottery ticket to the player system 310 as a separate draw lottery ticket image (e.g., based on the scanned draw lottery ticket data).

In various embodiments, the bet processor 340 generates the ticket purchase trailer to be: (1) printed on a printed ticket receipt that is separate from the printed draw lottery ticket; (2) printed on a printed ticket receipt that is attached to the printed draw lottery ticket; (3) printed on the printed draw lottery ticket itself; (4) stored as trailer image data that is separate from the printed draw lottery ticket (e.g., a trailer digital image); (5) trailer image data that is separate from a digital draw lottery ticket (e.g., a trailer digital image and a ticket digital image); and/or (6) trailer image data that is included with a digital draw lottery ticket (e.g., included in a combined ticket and trailer image).

Turning to FIG. 5, an example method 500 of operating the lottery ticket selling system 300 for a draw lottery ticket purchase in accordance with one example embodiment of the present disclosure is shown and described below.

The player system 310 requests a printer from the eTail system 330, as indicated at 502. In various embodiments, the request for the printer includes a request to lock a lottery ticket printer and a bet processor for the draw lottery ticket purchase.

The player system 310 provides an order request to the eTail system 330, as indicated at 504. In some embodiments, the order request includes the order request 370 described above.

The eTail system 330 generates and sends a wager request to the bet processor 340, as indicated at 506. In some embodiments, the wager request includes the bet slip data 371 described above.

The bet processor 340 generates and displays a bet slip QR code and thereby enables the lottery terminal 160 to obtain bet slip scan data, as indicated at 508. In some embodiments, the bet slip QR code includes the digital bet slip QR code 372 described above. In various embodiments, the e Tail system 330 generates and sends the bet slip QR code to the bet processor 340 and thereby enables the bet processor 340 to display the bet slip QR code. In various embodiments, the bet slip QR code includes additional information, such as the ticket purchase identifier.

The lottery terminal 160 generates and sends a bet request for the purchase of the draw lottery ticket to the lottery central system 390 and receives a bet response, as indicated at 510. In some embodiments, the bet request includes the bet request 374 described above. In some embodiments, the bet response includes the bet response 376 described above. In various embodiments, the bet request includes additional information, such as the ticket purchase identifier, and the lottery central system 390 stores the additional information.

The lottery terminal 160 causes the lottery ticket printer 180 to print the purchased draw lottery ticket and thereby enables the scanner station 350 to scan the printed draw lottery ticket, as indicated at 512. In various embodiments, the printed draw lottery ticket includes the bet details and ticket details and does not include the ticket purchase identifier. In various embodiments, the printed draw lottery ticket includes bet details and other information, such as the ticket purchase identifier.

The bet processor 340 causes the scanner station 350 to scan the printed draw lottery ticket and receives the ticket image data, as indicated at 514. In some embodiments, the ticket image data includes the ticket image data 382.

The bet processor 340 obtains the ticket details from the ticket image data, as indicated at 516. In some embodiments, the bet processor 340 employs an optical character recognition function and/or barcode reader function to obtain the ticket details 379 from the ticket image response 382, as described above.

In various embodiments, the bet processor 340 generates the ticket purchase trailer, such as the ticket purchase trailer 389, based on the ticket details and the ticket purchase identifier. As described above, the ticket purchase trailer 389 can include a QR code, a barcode, an image, or information in another suitable format.

The bet processor 340 provides the ticket details and the ticket image data to the eTail system 330, as indicated at 518. As described above, the ticket details can include the ticket serial number (e.g., ticket identifier 18), the player numbers, the security code that facilitates authentication of the purchased draw lottery ticket, and/or other suitable ticket information. In various embodiments, the bet processor 340 provides the ticket purchase trailer, such as a combined ticket and trailer image, to the eTail system 330.

The eTail system 330 provides the ticket details to the player system 310, as indicated at 520.

The player system 310 generates and sends a print request to the eTail system 330, as indicated at 522. In various embodiments, the print request includes ticket security data, such as the security code from the ticket details 379, an order identifier associated with the lottery ticket order 370, an original purchaser identifier associated with the original purchaser (e.g., a hash of the original purchaser identifying information), and/or other suitable information.

The eTail system 330 sends the ticket image data and the ticket purchase trailer to the player system 310 based on the print request, as indicated at 524. In some embodiments, the eTail system 330 sends the combined ticket and trailer image to the player system 310.

Turning to FIG. 6, an example method 600 of operating the lottery ticket selling system 700 for validating a draw lottery ticket and providing a winning amount for that winning draw lottery ticket in accordance with one example embodiment of the present disclosure is shown and described below.

In this example system and method, the player system 310 obtains winning lottery ticket information from the lottery central system 390, as indicated at 602. In this example embodiment, the lottery central system 390 hosts the draw cache that includes the winning lottery ticket information.

The player system 310 generates and sends a validation request to the eTail system 330, as indicated at 604. In various embodiments, the validation request includes ticket security data for a purchased draw lottery ticket, such as the security code from the ticket details 379, an order identifier associated with the lottery ticket order 370 for that purchased draw lottery ticket, a ticket serial number, an original purchaser identifier associated with the original purchaser (e.g., player hash), and/or other suitable information. In various embodiments, the player system 310 generates the validation request based on a digital QR code, such as the ticket purchase trailer 389. In some such embodiments, the ticket purchase trailer 389 enables validation of the purchased draw lottery ticket without a printing of a validation receipt for that purchased draw lottery ticket (e.g., enabling an electronic validation).

The eTail system 330 sends a validation request that includes the ticket serial number to the lottery central system 390 via the lottery transaction engine 337, as indicated at 606. In some embodiments, the eTail system 330 employs a suitable application programming interface (API) to send the validation request to the lottery central system 390, such as a NASPL API.

The eTail system 330 receives a validation response that includes winning ticket details from the lottery central system 390 and provides the winning ticket information to the player system 310, as indicated at 608. In this example embodiment, a validation receipt is not printed for a winning draw lottery ticket. The player system 310 employs the winning details received from the eTail system 330 and determines whether the winning draw lottery ticket is below a "low tier" threshold, such as $600 in this example embodiment.

If the winning amount is less than $600, the player system 310 and/or the eTail system 330 automatically credit the winning amount for the draw lottery ticket to the original purchaser's account, as indicated at 610.

If the winning amount is more than $600, the player system 310 and/or the eTail system 330 provide an indication to cause a courier processing clerk to retrieve the stored winning draw lottery ticket from a courier storage location and send that winning draw lottery ticket to the original purchaser, as indicated at 612.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The claims are as follows:

1. A lottery ticket selling system comprising:

a lottery terminal associated with a code reader and a lottery ticket printer;

a lottery ticket scanner;

a bet processor that is associated with an electronic bet details display device and comprises a bet trailer processor and a bet trailer memory device that stores a first plurality of instructions; and an electronic ticket retail server comprising a server processor and a server memory device that stores a second plurality of instructions, which when executed by the server processor, cause the server processor to:

receive an order from a player electronic device associated with an original purchaser, the order comprising bet details for a purchase of a draw lottery ticket;

generate a ticket purchase identifier for the draw lottery ticket prior to the purchase of the draw lottery ticket, wherein the original purchaser is uniquely identifiable using the ticket purchase identifier;

generate bet slip data that comprises the bet details for the draw lottery ticket; and send the bet slip data and the ticket purchase identifier to the bet processor;

wherein the first plurality of instructions stored on the bet processor memory device, when executed by the bet trailer processor, cause the bet trailer processor to:

generate a digital bet slip that includes the bet details based on the bet slip data;

display the digital bet slip via the electronic bet details display device to enable the lottery terminal to scan the displayed digital bet slip via the code reader, cause a purchase of the draw lottery ticket, and cause the lottery ticket printer to print the draw lottery ticket;

cause the lottery ticket scanner to scan the printed draw lottery ticket to obtain ticket image data for the printed draw lottery ticket;

obtain ticket details for the printed draw lottery ticket from the ticket image data; and generate a ticket purchase trailer for the printed draw lottery ticket based on the ticket details and the ticket purchase identifier, wherein the ticket purchase trailer comprises the ticket purchase identifier and associates the original purchaser with the printed draw lottery ticket.

2. The lottery ticket selling system of claim 1, wherein the ticket purchase trailer comprises the ticket purchase identifier and the ticket details associated with the printed draw lottery ticket.

3. The lottery ticket selling system of claim 2, wherein the ticket details comprise a draw game identifier for the printed draw lottery ticket, a draw date for the printed draw lottery ticket, and player numbers for the printed draw lottery ticket.

4. The lottery ticket selling system of claim 1, wherein the ticket purchase trailer comprises a trailer digital image.

5. The lottery ticket selling system of claim 4, wherein the trailer digital image comprises a digital QR code comprising the ticket purchase identifier.

6. The lottery ticket selling system of claim 5, wherein the digital QR code further comprises the ticket details.

7. The lottery ticket selling system of claim 6, wherein the digital QR code enables validation of the printed draw lottery ticket.

8. The lottery ticket selling system of claim 4, wherein the first plurality of instructions stored on the bet trailer memory device, when executed by the bet trailer processor, cause the bet trailer processor to generate a combined ticket and trailer image that comprises the trailer digital image appended to the ticket image data.

9. The lottery ticket selling system of claim 4, wherein the first plurality of instructions stored on the bet trailer memory device, when executed by the bet trailer processor, cause the bet trailer processor to generate an augmented ticket and trailer image by modifying the ticket image data to comprise the ticket purchase trailer without changing a pixel aspect ratio of the ticket image data.

10. The lottery ticket selling system of claim 4, wherein the first plurality of instructions stored on the bet trailer memory device, when executed by the bet trailer processor, cause the bet trailer processor to send the trailer digital image and the ticket digital image to the player electronic device via the electronic ticket retail server.

11. A lottery ticket selling system comprising:

a lottery terminal associated with a code reader and a lottery ticket printer;

a lottery ticket feeder comprising a housing and a plurality of roll engagers supported by the housing;

a lottery ticket scanner;

a bet processor that comprises an electronic bet details display device, a bet trailer processor, and a bet trailer memory device that stores a first plurality of instructions; and an electronic ticket retail server comprising a server processor and a server memory device that stores a second plurality of instructions, which when executed by the server processor, cause the server processor to:

receive an order from a player electronic device associated with an original purchaser, the order comprising bet details for a purchase of a draw lottery ticket;

generate a ticket purchase identifier for the draw lottery ticket prior to the purchase of the draw lottery ticket, wherein the original purchaser is uniquely identifiable using the ticket purchase identifier;

generate bet slip data that comprises the bet details for the draw lottery ticket; and send the bet slip data and the ticket purchase identifier to the bet processor;

wherein the first plurality of instructions stored on the bet processor memory device, when executed by the bet trailer processor, cause the bet trailer processor to:

generate a digital bet slip that includes the bet details based on the bet slip data;

display the digital bet slip via the electronic bet details display device to enable the lottery terminal to scan the displayed digital bet slip via the code reader, cause a purchase of the draw lottery ticket, and cause the lottery ticket printer to print the draw lottery ticket;

cause the lottery ticket feeder to feed the printed draw lottery ticket to the lottery ticket scanner;

cause the lottery ticket scanner to scan the printed draw lottery ticket to obtain ticket image data for the printed draw lottery ticket;

obtain ticket details for the printed draw lottery ticket from the ticket image data; and generate a ticket purchase trailer for the printed draw lottery ticket based on the ticket details and the ticket purchase identifier, wherein the ticket purchase trailer comprises the ticket purchase identifier and associates the original purchaser with the printed draw lottery ticket.

12. The lottery ticket selling system of claim 11, wherein the first plurality of instructions stored on the bet trailer memory device, when executed by the bet trailer processor, cause the bet trailer processor to:

encode the ticket details and the ticket purchase identifier into a digital QR code; and generate a combined ticket and trailer image that comprises the ticket image data and the digital QR code.

13. The lottery ticket selling system of claim 12, wherein the printed draw lottery ticket comprises the ticket details.

14. The lottery ticket selling system of claim 13, wherein the ticket purchase identifier is independent from the ticket details.

15. The lottery ticket selling system of claim 12, wherein the digital QR code enables validation of the printed draw lottery ticket.

16. A lottery ticket selling system comprising:

a lottery terminal associated with a code reader and a lottery ticket printer;

a lottery ticket scanner;

a bet processor that is associated with an electronic bet details display device and comprises a bet trailer processor and a bet trailer memory device that stores a first plurality of instructions;

a lottery central system comprising a central server processor and a central server memory device that stores a second plurality of instructions; and an electronic ticket retail server comprising a ticket server processor and a ticket server memory device that stores a third plurality of instructions, which when executed by the ticket server processor, cause the ticket server processor to:

receive an order from a player electronic device associated with an original purchaser, the order comprising bet details for a purchase of a draw lottery ticket;

generate a ticket purchase identifier for the draw lottery ticket prior to the purchase of the draw lottery ticket, wherein the original purchaser is uniquely identifiable using the ticket purchase identifier;

generate bet slip data that comprises the bet details for the draw lottery ticket; and send the bet slip data and the ticket purchase identifier to the bet processor;

wherein the first plurality of instructions stored on the bet processor memory device, when executed by the bet trailer processor, cause the bet trailer processor to:

generate a digital bet slip that includes the bet details based on the bet slip data;

display the digital bet slip via the electronic bet details display device to enable the lottery terminal to scan the displayed digital bet slip via the code reader, cause a purchase of the draw lottery ticket by the lottery central system, and cause the lottery ticket printer to print the draw lottery ticket;

cause the lottery ticket scanner to scan the printed draw lottery ticket to obtain ticket image data for the printed draw lottery ticket;

obtain ticket details for the printed draw lottery ticket from the ticket image data; and generate a ticket purchase trailer for the printed draw lottery ticket based on the ticket details and the ticket purchase identifier, wherein the ticket purchase trailer comprises the ticket purchase identifier and associates the original purchaser with the printed draw lottery ticket.

17. The lottery ticket selling system of claim 16, wherein the first plurality of instructions stored on the bet trailer memory device, when executed by the bet trailer processor, cause the bet trailer processor to:

encode the ticket details and the ticket purchase identifier into a digital QR code; and generate a combined ticket and trailer image that comprises the ticket image data and the digital QR code.

18. The lottery ticket selling system of claim 17, wherein the first plurality of instructions stored on the bet trailer memory device, when executed by the bet trailer processor, cause the bet trailer processor to generate the combined ticket and trailer image by modifying the ticket image data to comprise the ticket purchase trailer without changing a pixel aspect ratio of the ticket image data.

19. The lottery ticket selling system of claim 17, wherein the digital QR code enables validation of the printed draw lottery ticket.

20. The lottery ticket selling system of claim 19, wherein the second plurality of instructions, when executed by the central server processor, cause the central server processor to:

receive, from the electronic ticket retail server, a validation request for the printed draw lottery ticket based on the digital QR code; and send, to the electronic ticket retail server, a validation response comprising winning ticket information associated with the printed draw lottery ticket.

* * * * *